(12) United States Patent
Curry et al.

(10) Patent No.: US 7,031,518 B2
(45) Date of Patent: *Apr. 18, 2006

(54) SEGMENTATION METHOD AND SYSTEM FOR MULTIPLE RASTER CONTENT (MRC) REPRESENTATION OF DOCUMENTS

(75) Inventors: Donald J. Curry, Menlo Park, CA (US); Doron Kletter, San Mateo, CA (US); Asghar Nafarieh, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 766 days.

This patent is subject to a terminal disclaimer.

(21) Appl. No.: 10/188,249

(22) Filed: Jul. 1, 2002

(65) Prior Publication Data

US 2004/0001625 A1 Jan. 1, 2004

(51) Int. Cl.
*G06K 9/34* (2006.01)

(52) U.S. Cl. ...................... 382/173; 382/164

(58) Field of Classification Search ................ 382/173, 382/275, 253, 233, 238, 248, 240, 251, 176, 382/164; 358/1, 9, 500, 3.26; 345/426
See application file for complete search history.

(56) References Cited

U.S. PATENT DOCUMENTS

| | | | | |
|---|---|---|---|---|
| 4,849,914 A | | 7/1989 | Medioni et al. ............. 382/112 |
| 5,001,767 A | * | 3/1991 | Yoneda et al. .............. 382/176 |
| 5,515,452 A | | 5/1996 | Penkethman et al. ....... 382/141 |
| 5,583,659 A | | 12/1996 | Lee et al. ................... 358/3.13 |
| 5,729,360 A | * | 3/1998 | Kita et al. .................. 358/500 |
| 5,745,596 A | | 4/1998 | Jefferson .................... 382/176 |
| 5,900,953 A | | 5/1999 | Bottou et al. ............... 358/540 |
| 6,058,214 A | | 5/2000 | Bottou et al. ............... 382/240 |
| 6,141,446 A | * | 10/2000 | Boliek et al. ............... 382/233 |
| 6,324,305 B1 | | 11/2001 | Holladay et al. ........... 382/239 |
| 6,343,154 B1 | | 1/2002 | Bottou et al. ............... 382/240 |
| 6,400,844 B1 | | 6/2002 | Fan et al. ................... 382/173 |
| 6,633,670 B1 | | 10/2003 | Matthews ................... 382/116 |
| 6,754,394 B1 | * | 6/2004 | Boliek et al. ............... 382/240 |
| 6,859,204 B1 | | 2/2005 | Curry et al. |
| 6,876,468 B1 | * | 4/2005 | Kanno et al. ............... 358/1.9 |
| 6,983,076 B1 | | 1/2006 | Curry et al. |

(Continued)

FOREIGN PATENT DOCUMENTS

EP 0 712 094 A2 5/1996

(Continued)

OTHER PUBLICATIONS

R. De Queiroz, "Compression of compound Documents," *IEEE*, 1999.

(Continued)

*Primary Examiner*—Anh Hong Do
(74) *Attorney, Agent, or Firm*—Oliff & Berridge, PLC

(57) ABSTRACT

A method and a system for separating an image signal into a set of image planes. The system comprises a min-max module, a dynamic threshold module and a separation module. The min-max module receives the image signal, searches for a minimum and maximum within at least one window centered on a current pixel in the image signal. The dynamic threshold module computes, for the window, based on the respective minimum and maximum received from the min-max module and the current pixel, a respective indicator representing the distance and direction of the current pixel relative to a respective threshold plane, and outputs a control signal based on the indicator. The separation module separates the image signal into the set of image planes in accordance with the control signal by including a representation of the current pixel in at least one of the image planes.

26 Claims, 13 Drawing Sheets

U.S. PATENT DOCUMENTS

| | | |
|---|---|---|
| 6,987,882 B1 | 1/2006 | Curry et al. |
| 2004/0001234 A1 | 1/2004 | Curry et al. |

FOREIGN PATENT DOCUMENTS

| | | |
|---|---|---|
| EP | 1 006 716 A2 | 6/2000 |

OTHER PUBLICATIONS

U.S. Appl. No. 10/187,499, filed Jul. 2002, Donald J. Curry et al.
U.S. Appl. No. 10/188,026, filed Jul. 2002, Donald J. Curry et al.
U.S. Appl. No. 10/188,157, filed Jul. 2002, Donald J. Curry et al.
U.S. Appl. No. 10/188,277, filed Jul. 2002, Donald J. Curry et al.
U.S. Appl. No. 10/612,057, filed Jul. 2003, Donald J. Curry et al.
U.S. Appl. No. 10/612,062, filed Jul. 2003, Donald J. Curry et al.
U.S. Appl. No. 10/612,063, filed Jul. 2003, Donald J. Curry et al.
U.S. Appl. No. 10/612,064, filed Jul. 2003, Donald J. Curry et al.
U.S. Appl. No. 10/612,084, filed Jul. 2003, Donald J. Curry et al.
U.S. Appl. No. 10/612,234, filed Jul. 2003, Donald J. Curry et al.
U.S. Appl. No. 10/612,246, filed Jul. 2003, Donald J. Curry et al.
U.S. Appl. No. 10/612,248, filed Jul. 2003, Donald J. Curry et al.
U.S. Appl. No. 10/612,250, filed Jul. 2003, Donald J. Curry et al.
U.S. Appl. No. 10/612,368, filed Jul. 2003, Donald J. Curry et al.
U.S. Appl. No. 10/612,461, filed Jul. 2003, Donald J. Curry et al.
U.S. Appl. No. 10/612,261, filed Jul. 2003, Donald J. Curry et al.
U.S. Appl. No. 10/776,515, filed Feb. 12, 2004, Curry et al.
U.S. Appl. No. 10/776,514, filed Feb. 12, 2004, Curry et al.
U.S. Appl. No. 10/776,608, filed Feb. 12, 2004, Curry et al.
U.S. Appl. No. 10/776,602, filed Feb. 12, 2004, Curry et al.
U.S. Appl. No. 10/776,620, filed Feb. 12, 2004, Curry et al.
U.S. Appl. No. 10/776,603, filed Feb. 12, 2004, Curry et al.
U.S. Appl. No. 10/776,509, filed Feb. 12, 2004, Claasen et al.
U.S. Appl. No. 10/776,508, filed Feb. 12, 2004, Curry et al.
U.S. Appl. No. 10/776,516, filed Feb. 12, 2004, Curry et al.
U.S. Appl. No. 10/776,612, filed Feb. 12, 2004, Curry et al.

* cited by examiner

| CONDITION | $X_9$ INPUT | $X_5$ INPUT | SEL1 OUTPUT | SEL0 OUTPUT | ENA OUTPUT |
|---|---|---|---|---|---|
| No activity in either window | $X_9 \leq STH$ | X | 0 | X | 0 |
| Coarse window active only | $X_9 > STH$ | $X_5 \leq STH$ | 1 | 0 | 0 |
| Both windows active | $X_9 > STH$ | $X_5 > STH$ | 1 | 1 | 1 |

SEGMENTATION METHOD AND SYSTEM FOR MULTIPLE RASTER CONTENT (MRC) REPRESENTATION OF DOCUMENTS

CROSS-REFERENCE TO RELATED APPLICATIONS

The present application is related to the following applications: Ser. No. 10/187,499, entitled "Digital De-Screening of Documents", Ser. No. 10/188,026, now U.S. Pat. No. 6,983,076, entitled "Control System for Digital De-Screening of Documents", Ser. No. 10/188,277, now U.S. Pat. No. 6,859,204, entitled "Dynamic Threshold System for Multiple Raster Content (MRC) Representation of Documents", Ser. No. 10/188,157, now U.S. Pat. No. 6,987,882, entitled "Separation System for Multiple Raster Content (MRC) Representation of Documents", all filed Jul. 1, 2002, on the same date as the present application and commonly assigned to the present assignee, the contents of which are herein incorporated by reference.

BACKGROUND OF THE INVENTION

1. Field of the Invention

The present invention relates generally to methods and systems for segmenting digitally scanned documents into two or more planes, and more particularly to methods and systems for segmenting digitally scanned documents into planes suitable for a Multiple Raster Content (MRC) representation of documents.

2. Description of Related Art

The MRC representation of documents is versatile. It provides the ability to represent color images and either color or monochrome text. The MRC representation enables the use of multiple "planes" for the purpose of representing the content of documents. The MRC representation is becoming increasingly important in the marketplace. It has been already established as the main color-fax standard.

In an MRC representation, an image is represented by more than one image plane. The main advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded (possibly at higher resolution than 1 bit per pixel) in one of the planes, called the Selector plane. Following a careful separation, the various planes could be independently compressed using standard compression schemes (such as JPEG and G4) with good compression and high quality at the same time.

There is a need for a method and a system for efficiently separating an image into a set of planes, such that the advantages of the MRC representation can be fully exploited.

SUMMARY OF THE INVENTION

A method and a system for separating an image signal into a set of image planes are disclosed. The system comprises a min-max module, a dynamic threshold module and a separation module. The min-max module receives the image signal, searches for a minimum and maximum within at least one window centered on a current pixel in the image signal. The dynamic threshold module computes, for the window, based on the respective minimum and maximum received from the min-max module and the current pixel, a respective indicator representing the distance and direction of the current pixel relative to a respective threshold plane, and outputs a control signal based on the indicator. The separation module separates the image signal into the set of image planes in accordance with the control signal by including a representation of the current pixel in at least one of the image planes.

BRIEF DESCRIPTION OF THE DRAWINGS

The features and advantages of the present invention will become apparent from the following detailed description of the present invention in which.

DETAILED DESCRIPTION OF THE INVENTION

The present invention provides a method and a system for separating an image signal into a set of image planes. The image signal represents a digitally scanned document. The image planes are suitable for a Mixed Raster Content (MRC) representation of the digitally scanned document.

Figure 1:
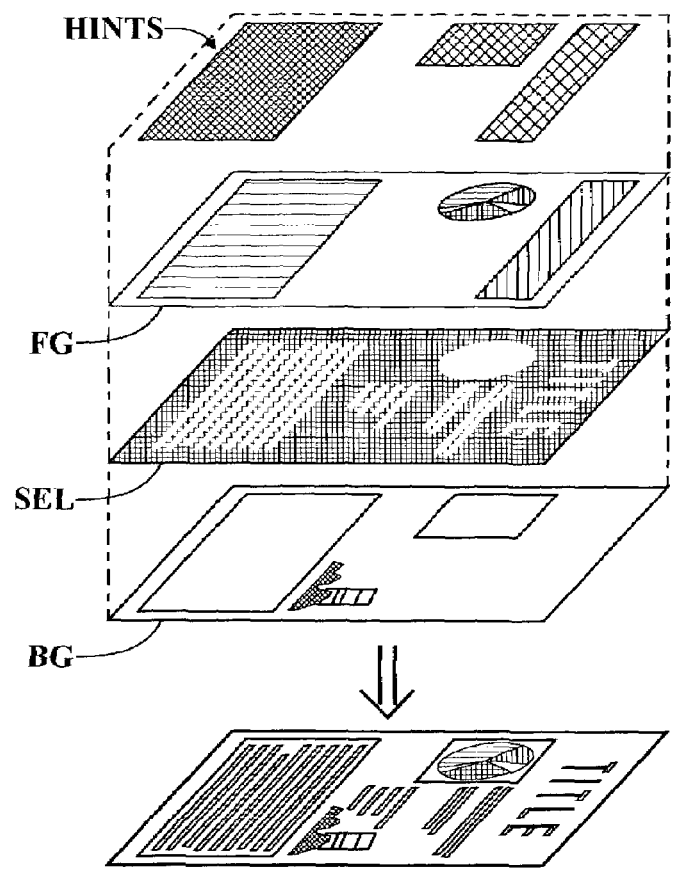
FIG. 1 illustrates the MRC structure for documents.

FIG. 1 shows the general MRC representation. The representation comprises up to four independent planes: Foreground, Background, Selector, and Rendering Hints. In the most general case, there could be multiple Foreground and Selector pairs at higher levels. However, in most applications, the representation is limited to three or four planes. The Background plane is typically used for storing continuous-tone information such as pictures and/or smoothly varying background colors. The Selector plane normally holds the image of text (binary) as well as other edge information (e.g., line art drawings). The Foreground plane usually holds the color of the corresponding text and/or line art. However, the MRC representation only specifies the planes and their associated compression methods. It does not otherwise restrict nor enforce the content of each of the planes. The content of each of the planes may be defined appropriately by an implementation of the MRC representation.

The MRC structure also allows for a fourth plane, the Rendering Hints plane, which is used for communicating additional information about the content of the document. For example, the Rendering Hints plane may carry the ICC (International Color Consortium) color hints that identify the best color matching strategy for the various objects on the page.

The Foreground and Background planes are defined to be two full-color (L, a, b) planes. The Selector plane is defined as a binary (1-bit deep) plane. The Rendering Hints plane is typically restricted to an 8-bit plane. One exemplary MRC representation specifies that the Foreground and Background are to be JPEG compressed, and that the Selector plane is to be ITU-G4 compressed (standard Group 4 facsimile compression). The Rendering Hints plane is considered to be optional, but if one is used, a compression scheme similar to the Lempel-Zev-Welch scheme may be used for its compression. In general, the Foreground, Background, Selector and Rendering Hints planes can all be at different resolutions, and they are not required to maintain the original source input resolution.

The method for assembling back a "segmented" MRC image from its components (i.e., planes) is by "pouring" the Foreground colors through the Selector plane "mask" on top of the Background plane, thus overwriting the previous content of the Background plane at these locations. In other words, the assembly is achieved by multiplexing between the Foreground and Background information on a pixel by pixel basis, based on the binary control signal of the Selector plane. For example, if the Selector value is 1, the content of Foreground is used; otherwise (i.e., for Selector value=0) the content of Background is used. The multiplexing operation is repeated on a pixel by pixel basis until all of the output pixels have been defined.

The main advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded (possibly at higher resolution than 1 Selector sample per source pixel) in the Selector plane. Following a careful separation, the various planes could be independently compressed using standard compression schemes (such as JPEG and G4) with good compression and high quality at the same time.

The Segmentation system of the present invention is used for splitting an incoming image into three or more planes suitable for an MRC representation of the image.

Figure 2:
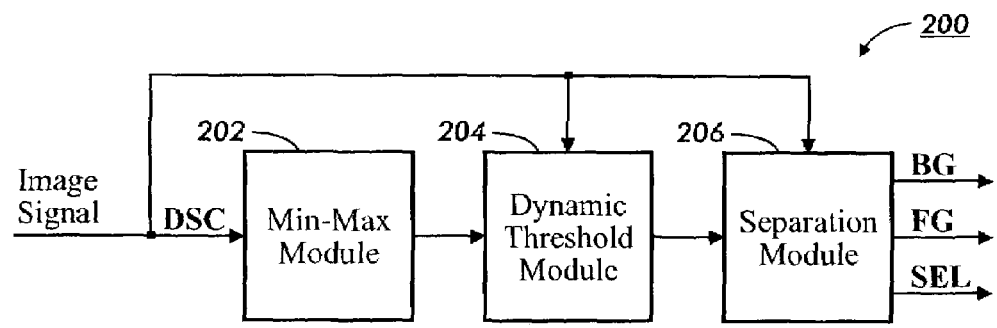
FIG. 2 shows the block diagram of the system of the present invention.

FIG. 2 shows a block diagram of the Segmentation system of the present invention. Segmentation system 200 comprises a Min-Max module 202, a Dynamic Threshold module 204 and a Separation module 206. The Min-Max module 202 receives the image signal DSC, searches for minima and maxima within a set of windows centered on a pixel in the image signal. The Dynamic Threshold module 204 computes, for each of the windows, based on the minima and maxima received from the min-max module and the current pixel, a respective indicator representing the distance and direction of the current pixel relative to a respective threshold plane, and outputs a control signal based on the indicators. The Separation module 206 separates the image signal into the set of image planes in accordance with the control signal by including a representation of the current pixel in at least one of the image planes.

Figure 3:
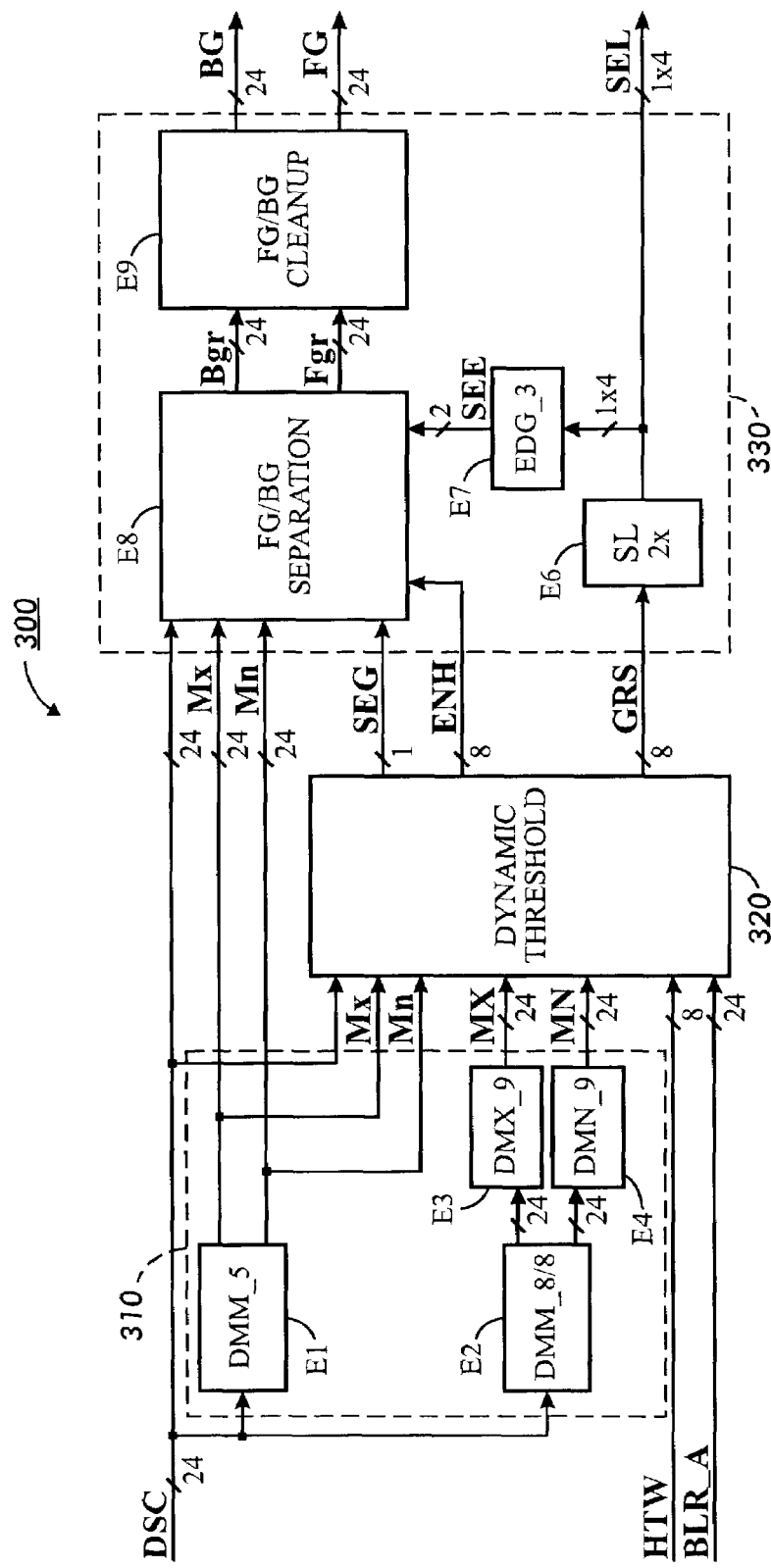
FIG. 3 shows the block diagram of an embodiment of the system of the present invention.

FIG. 3 shows a block diagram of one embodiment 300 of the Segmentation system 200.

For best performance of the Segmentation system 300, the input signal DSC should be free of most of the original mid-frequency halftone patterns of the original scanned image. These halftone frequencies are typically eliminated by passing the input image through a de-screen system first. However, in some situations, such as for clean PDL (Page Description Language) printing, the input signal may be known to be free of problematic halftone frequencies. In such situations, the de-screen operation is not needed and the clean input signal can be directly fed into the Segmentation system.

For ease of explanation, in the description of the Segmentation system 300 herein, the source input image DSC, as well as the Foreground FG and Background BG outputs, are all assumed to be full-color (L, a, b) planes, while the Selector plane SEL output is binary (1-bit). It is understood that these assumptions are not to be construed as limitations of the applications of the present invention.

In general, the Foreground, Background, and Selector planes could all be at different resolutions relative to the input image DSC. For example, the Foreground and Background planes are typically down-sampled (for better compression) while the Selector plane is typically up-sampled (for better edge quality) from the original input resolution. The amount of up or down sampling may be fully programmable under software control.

The Segmentation system 300 may also receive and use the optional estimated frequency Halftone Weight HTW and full color Super Blur BLR_A signals when they are available. These optional signals may be generated by a de-screen or filtering system such as the one described in a co-pending patent application. The optional full color Super Blur BLR_A signal may be generated by lowpass filtering the image source signal with a filter that has a very large filter span (i.e., very low cut-off frequency). The optional estimated frequency Halftone Weight HTW will be described in detail later in connection with FIG. 18, FIG. 19 and FIG. 20.

The Segmentation system 300 comprises a Min-Max module 310, a Dynamic Threshold module 320, and a Separation module 330.

The Min-Max module 310 comprises a Dependent Min-Max block E1, a Dependent Min-Max Sub-Sample block E2 and two Dependent Min-Max blocks E3, E4. The Min-Max module 310 receives the input image signal DSC (3-dimensional), computes and outputs two sets of maximum and minimum vectors (Mx, Mn), (MX, MN), each set corresponding to a different window.

The Dynamic Threshold module 320 receives the input image signal DSC, and the vectors (Mx, Mn), (MX, MN) from the Min-Max module 310 and computes, for each of the windows, based on the respective minimum and maximum received from the min-max module and the current pixel, a respective indicator representing the distance and direction of the current pixel relative to a respective threshold plane, and outputs based on the indicators a control signal GRS to the Separation module 330. The optional control signals SEG, ENH may also be outputted. The Dynamic Threshold module 320 also receives the optional estimated frequency Halftone Weight HTW and full color Super Blur BLR_A signals when they are available.

The Separation module 330 comprises a Selector Logic block E6, an Edge Processing block E7, a FG/BG Separation block E8, and a FG/BG Cleanup block E9. The Separation module 330 receives the image signal DSC, the vectors Mx, Mn from the Min-Max module 310, the control signal GRS and the optional control signals SEG, ENH from the Dynamic Threshold module 320, and outputs the three signals BG, FG, SEL, which correspond to the Background, Foreground, and Selector planes of an MRC representation of the image DSC, respectively.

The Dependent Min-Max block E1 receives the input image signal DSC, and searches in a 5×5 window centered on the current pixel of interest for the minimum value (vector) Mn and maximum value (vector) Mx. The vectors Mn and Mx represent the minimum and maximum in the window context of 5×5 pixels. The meaning of these rectors will be described in detail later.

The Dependent Min-Max Sub-Sample block E2 receives the input image signal DSC, and searches for the minimum and maximum luminance value in each of the non-overlapping 8×8 windows, and also provides the corresponding chroma values at these locations. By using non-overlapping 8×8 windows, the Dependent Min-Max Sub-Sample block E2 effectively sub-samples the minimum and maximum values by a factor of 8 in each direction, thus reducing the overall bandwidth by a factor of 64. The sub-sampled outputs are then fed to the two Dependent Min-Max blocks E3 and E4, which search for the minimum and maximum vectors MN and MX over a 9×9 window centered on the original (before sub-sampling) 8×8 window that contains the current pixel of interest. Thus, the MN and MX vectors correspond to the minimum of all the minima and the maximum of all the maxima from the non-overlapping 8×8 windows, respectively. Due to the sub-sampling (by 8) effect, the 9×9 window actually corresponds to a window context of 72×72 pixels. It is noted that capital letters are used for vectors MN and MX to distinguish them from the vectors Mn and Mx (outputs of block E1) and to indicate that they represent the minimum and maximum in the larger window context of 72×72 pixels overall.

The two sets of minimum and maximum vectors (Mn, Mx) and (MN, MX) are fed to the Dynamic Threshold Module 320. The Dynamic Threshold Module 320 outputs the monochrome 8-bit signal GRS whose biased zero crossings represent the locations of edges in the Selector planes. In addition, The Dynamic Threshold Module may also generate the optional binary control signal SEG and the optional 8-bit segmentation enhancement control ENH. The optional binary control signal SEG provides an external means (similar to that of an override switch) to control the segmentation operation of the FG/BG Separation block E8 of Separation module 330 (see equations (14) through (20)). The optional 8-bit segmentation enhancement control ENH provides to the FG/BG Separation block E8 the amount of enhancement to apply.

The Selector Logic block E6 receives the 8-bit Gray Selector signal GRS from the Dynamic Threshold Module 320, up-samples it by doubling the resolution, and then thresholds it at the zero crossings to produce the binary Selector plane output SEL. For high-quality text and line-art reproduction, the Selector plane is typically kept at twice the input resolution (1200 dpi for a 600 dpi input), although it could be programmed for even higher ratio (in one implementation, up to 8 times the input resolution) under software control.

But in applications that do not require very high quality, the Selector plane could be at the same resolution as the input signal DSC. The Edge Processing block E7 receives the high resolution Selector output SEL and counts the number of ON and OFF pixels in a 5×5 (high-resolution) window centered on the current (low-resolution) pixel of interest. The Edge Processing block E7 outputs the two-bit signal SEE. The SEE signal is set to 0 if all of the input pixels inside the 5×5 window are OFF (corresponding to a 5×5 constant Background area). Similarly, the SEE signal is set to 3 if all of the input pixels inside the window are ON (corresponding to a 3×3 constant Foreground area). The SEE output is set to 1 or 2 if the 3×3 window is mostly Background (white) or mostly Foreground (black), respectively.

The FG/BG Separation block E8 receives the full color source signal DSC to be segmented, the full color minimum and maximum vectors Mn, Mx from the Dependent Min-Max block E1, the SEE signal from the Edge Processing block E7, the optional segmentation signal SEG, and the enhancement control signal ENH from the Dynamic Threshold Module 320. The FG/BG Separation block E8 performs the MRC segmentation to generate the Foreground and Background information, and produces two full-color outputs Fgr and Bgr as the rough estimates of the Foreground and Background planes, respectively.

The FG/BG Cleanup block E9 applies additional processing on the rough Foreground and Background estimates Fgr and Bgr to generate the final Foreground and Background outputs FG and BG. This additional processing is to slightly extend the Foreground and Background values beyond the edges and to fill in the undefined pixels in the Foreground and Background planes with appropriate values. The purpose of this processing is to prevent artifacts that may result from a subsequent sampling and JPEG compression and to fill in the yet-undefined pixels with values that will result in good JPEG compression ratio.

An additional logic inside the FG/BG Cleanup block E9 (see Tile Tag block F7 of FIG. 14) also monitors the Foreground and Background output values to detect and flag tiles that are almost all-black or all-white. Rather than encode the output from such tiles into the output file, a special tile marker is used and referenced whenever such a tile is detected. This increases the overall compression ratio by eliminating the need to repeatedly encode the common all-white or all-black tiles.

The blocks included in the Min-Max module 310 will be discussed in detail in the following.

The Dependent Min-Max block E1 looks for the maximum and minimum values of the luminance component L in a 5×5 window centered on the current pixel of interest, and outputs the full-color (luminance and chrominance) values at these locations. It is called a Dependent Min-Max to indicate that it only searches for the minimum and maximum over a single component, which is the luminance L, and not over all three components of the image signal DSC. Once the locations of the minimum and maximum luminance are found, the chroma components (a, b) at these locations are also outputted.

The Dependent Min-Max block E1 outputs two vectors of full-color (L, a, b) signals Mn=($L_{Mn}$, $a_{Mn}$, $b_{Mn}$), and Mx=($L_{Mx}$, $a_{Mx}$, $b_{Mx}$), corresponding to the minimum and maximum values in the 5×5 window, respectively. The outputs Mn and Mx are at the same pixel rate as the input signal DSC.

Figure 4:
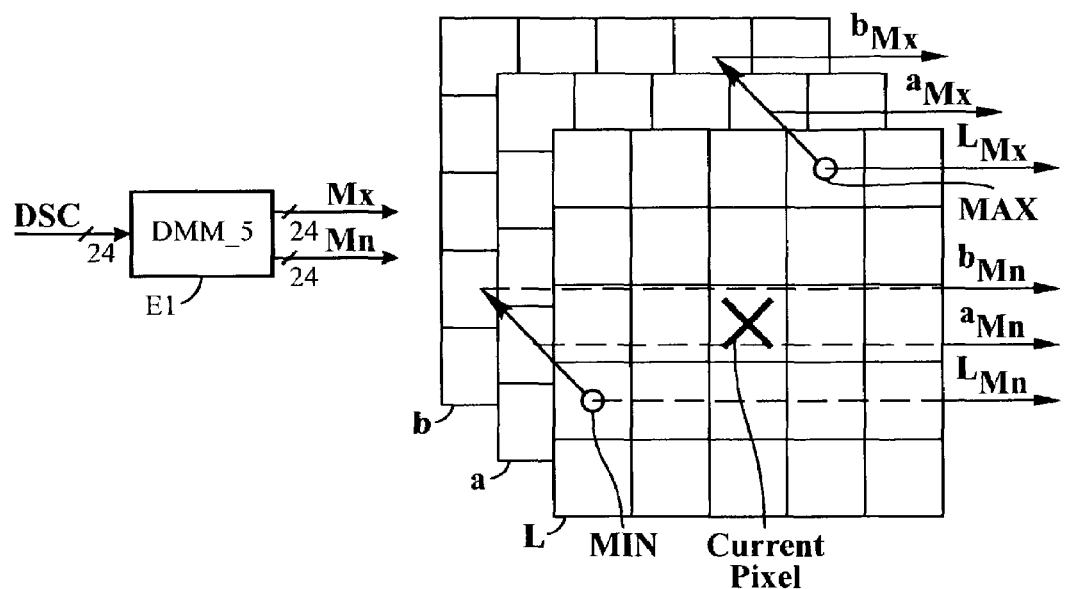
FIG. 4 illustrates the function of the Dependent Min-Max block E1 used in one embodiment of the system of the present invention.

FIG. 4 illustrates the operation of the Dependent Min-Max block E1. The content of the DSC luminance data is first searched in a 5×5 luminance window centered on the current pixel of interest to find the locations of the smallest and largest L values. If the minimum or maximum L values are not unique (that is, if there is more than one location having the same minimum or maximum value), the location of the one first encountered is used. The output of this search process is a unique pair ($L_{Mn}$, $L_{Mx}$) of the minimum and maximum L values as well as their relative location within the 5×5 window.

The Dependent Min-Max block E1 then uses the relative location information to index the corresponding chroma (a, b) components in the two corresponding 5×5 chroma windows and retrieve the chroma values at these locations. Thus, the relative location of the maximum L value $L_{Mx}$ is used to address the 5×5 chroma windows and retrieve the chroma pair ($a_{Mx}$, $b_{Mx}$) at this location. Together, the triplet ($L_{Mx}$, $a_{Mx}$, $b_{Mx}$) forms the output Mx from the Dependent Min-Max block E1. Similarly, the relative location of the minimum L value $L_{Mn}$ is used to address the 5×5 chroma windows and retrieve the chroma pair ($a_{Mn}$, $b_{Mn}$) at this location. The triplet ($L_{Mn}$, $a_{Mn}$, $b_{Mn}$) forms the output Mn from the Dependent Min-Max block E1.

The implementation of the Dependent Min-Max block E1 can be greatly accelerated by taking advantage of the sequential nature of the operation and the type of operations (min-max) that is being performed. For example, as the operation is advanced to the subsequent pixel, the extreme values (i.e., maximum and minimum) and corresponding locations for the previous pixel are already known. Since the current 5×5 window greatly overlaps the previous window, by keeping track of the previous window content, the Dependent Min-Max block E1 has to sort out only the newest and oldest 5×1 columns of L values on either side of the previous window. The center 3×5 area is common to both previous window and current window, and the new address locations of the previous minimum and maximum values in the previous window are at an offset of 1 in the fast scan direction relative to their previous locations. The previous minimum and maximum are compared to values in the newest column of L values to yield the new maximum and minimum L values.

Figure 5:
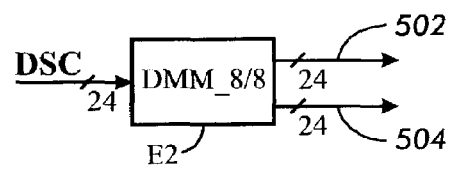
FIG. 5 illustrates the function of the Dependent Min-Max Sub-Sample block E2 used in one embodiment of the system of the present invention.

FIG. 5 illustrates the Dependent Min-Max Sub-Sample block E2. Block E2 receives the full-color (L, a, b) input signal DSC and produces two full-color sub-sampled minimum and maximum outputs 502 and 504. Block E2 searches for the minimum and maximum luminance values over non-overlapping 8×8 windows. The locations of the minimum and maximum luminance values are then used to index the chroma windows and retrieve the corresponding chroma values at these locations.

By using non-overlapping 8×8 windows, the operation of the Dependent Min-Max Sub-Sample block E2 is effectively sub-sampling the min and max outputs (that would have been produced had a sliding window been used instead of non-overlapping windows) by a factor of 8 in each direction, thereby reducing the overall output data rate by a factor of 64.

The minimum output 504 corresponds to the triplet ($L_{MIN}$, $a_{MIN}$, $b_{MIN}$) formed by the minimum luminance value $L_{MIN}$ of the input signal DSC within the 8×8 window containing the current pixel of interest, and the corresponding chroma (a, b) values ($a_{MIN}$, $b_{MIN}$) at this minimum luminance location. Similarly, the maximum output 502 corresponds to the triplet ($L_{MAX}$, $a_{MAX}$, $b_{MAX}$) formed by the maximum luminance value $L_{MAX}$ of the input signal DSC within the 8×8 window containing the current pixel of interest, and the corresponding chroma (a, b) values ($a_{MAX}$, $b_{MAX}$) at this maximum luminance location. If the minimum or maximum luminance values are not unique (i.e., if there is more than one location with the same maximum or minimum values), the one first encountered is used.

The sub-sampling operation is achieved by advancing the current pixel position by 8 in the fast scan direction (and also, upon reaching the end of a line, by 8 lines in the slow scan direction) to maintain the non-overlapping windows condition.

The 8-times (abbreviated as 8×) reduction factor (in each dimension) of the Dependent Min-Max Sub-Sample E2 block is designed in accordance with the amount of sub-sampling desired for the Foreground and Background planes (normally a sub-sampling factor of 2). For higher output image quality (as is the case with a clean PDL input image, for example), it may be desirable to not sub-sample the Foreground and Background outputs at all. In such a case, a smaller amount of sub-sampling factor (e.g., only 4×) is to be applied instead of the 8× factor above. If a sub-sampling factor of 4 (for each direction) is to be applied, 4×4 non-overlapping windows are used.

The Dependent Min-Max Sub-Sample block E2 is used in conjunction with the two Dependent Min and Max Units E3 and E4 to produce a Min-Max analysis similar to that of the Dependent Min-Max block E1, but covering a much larger area context (72×72 pixels as compared to 5×5 pixels) and at a coarser resolution to reduce the overall bandwidth.

Figure 6:
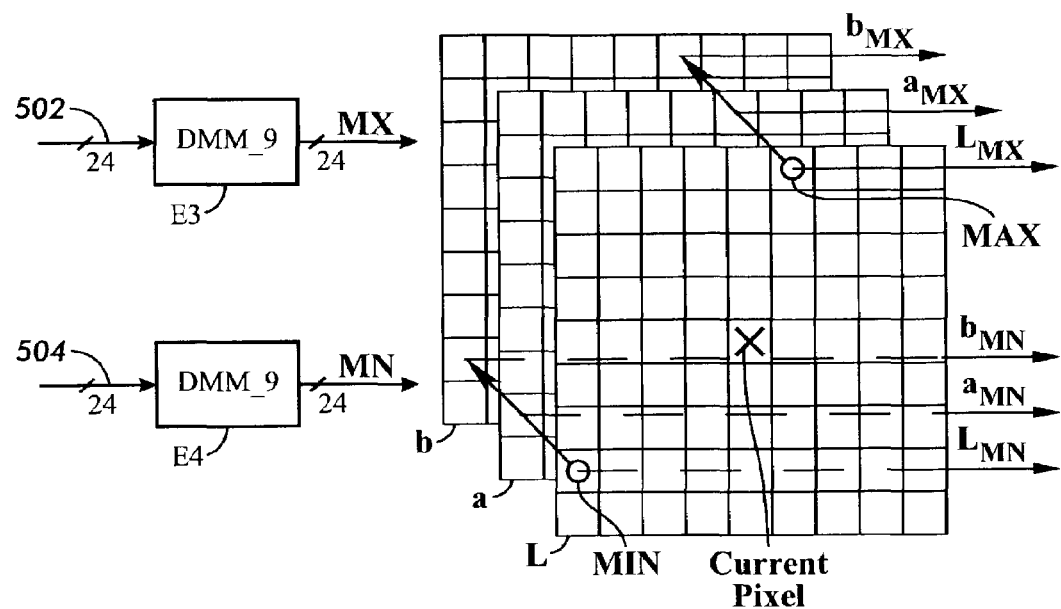
FIG. 6 illustrates the functions of the Dependent Max block E3 and Dependent Min block E4 used in one embodiment of the system of the present invention.

FIG. 6 illustrates the functions of the Dependent Max block E3 and Dependent Min block E4 as used in one embodiment of the system of the present invention.

The Dependent Max block E3 receives the full-color dependent maximum output 502 from the Dependent Min-Max Sub-Sample block E2, searches the content of the luminance data in the signal 502 in a 9×9 luminance window centered on the current pixel of interest to find the location of the maximum L value. If the maximum L value is not unique (that is, if there is more than one location having the same maximum value), the location of the one first encountered is used. The output of this search process is the maximum value $L_{MX}$ as well as its relative location within the 9×9 window.

The Dependent Max block E3 then uses the relative location information of $L_{MX}$ to index the corresponding chroma (a, b) components in the two corresponding 9×9 chroma windows and retrieve the chroma values at this location. Thus, the relative location of the maximum L value $L_{MX}$ is used to address the 9×9 chroma windows and retrieve the chroma pair ($a_{MX}$, $b_{MX}$) at this location (as illustrated in FIG. 6). The triplet ($L_{MX}$, $a_{MX}$, $b_{MX}$) forms the output MX of the Dependent Max block E3.

The Dependent Min block E4 receives the full-color dependent minimum output 504 from the Dependent Min-Max Sub-Sample block E2, searches the content of the luminance data in the signal 504 in a 9×9 luminance window centered on the current pixel of interest to find the location of the minimum L value. If the minimum L value is not unique (that is, if there is more than one location having the same minimum value), the location of the first one encountered is used. The output of this search process is the minimum value $L_{MN}$ as well as its relative location within the 9×9 window.

The Dependent Min block E4 then uses the relative location information of $L_{MN}$ to index the corresponding chroma (a, b) components in the two corresponding 9×9 chroma windows and retrieve the chroma values at this location. Thus, the relative location of the minimum L value $L_{MN}$ is used to address the 9×9 chroma windows and retrieve the chroma pair ($a_{MN}$, $b_{MN}$) at this location (as illustrated in FIG. 6). The triplet ($L_{MN}$, $a_{MN}$, $b_{MN}$) forms the output MN of the Dependent Min block E4.

By applying the Dependent Min block E4 on the dependent minimum output 504 of the Dependent Min-Max Sub-Sample block E2, the dependent minimum operation is effectively extended over a larger area to provide a dependent minimum analysis (the MN is minimum of minima received from block E2). Similarly, the Dependent Max block effectively provides a dependent maximum analysis over the extended area (the MX is maximum of maxima received from block E2). Since both inputs 502 and 504 are already sub-sampled by a factor of 8 in each direction (as compared to the original pixel resolution of input image DSC), the equivalent window area for each of the dependent minimum MN and maximum MX is 72×72 pixels at the original pixel resolution.

The Dynamic Threshold module 320 applies adaptive thresholding to the incoming source signal DSC to generate a monochrome 8-bit gray signal GRS output, whose zero crossings represent the edges in the Selector plane. The Dynamic Threshold module 320 utilizes the two sets of min/max values (Mn, Mx) and (MN, MX) from the 5×5 fine—and 9×9 coarse resolution windows and may also receive the Halftone Weight estimate HTW and the Super Blur BLR_A signals, when they are available. The Dynamic Threshold module 320 produces the gray selector signal GRS, the binary segmentation signal SEG and the 8-bit signal ENH, which is used to communicate the amount of segmentation enhancement to apply in the FG/BG Separation block E8.

Figure 7:
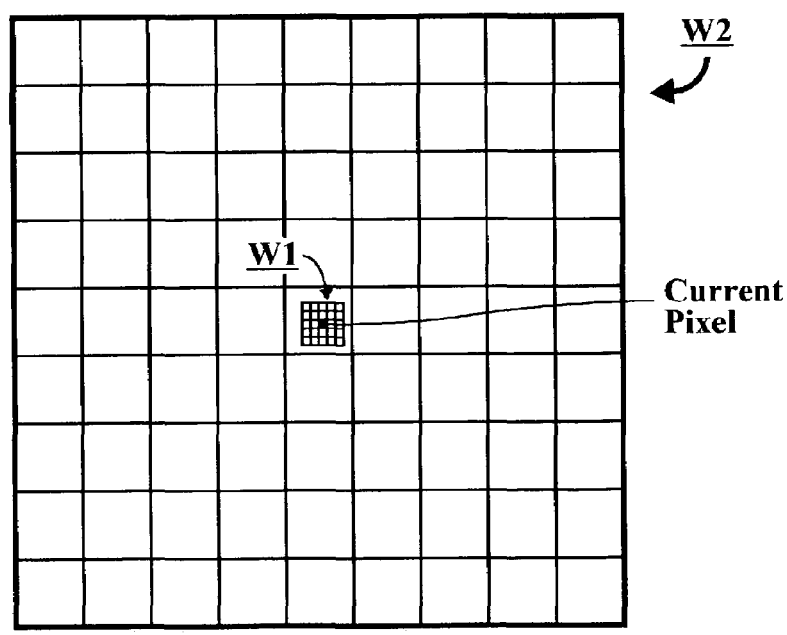
FIG. 7 illustrates the two window contexts employed by one embodiment of the Dynamic Threshold module.

FIG. 7 illustrates the three available choices of context area: the Single Pixel area which is the area of the current pixel of interest, the 5×5 High-Resolution window W1, and the 9×9 Coarse Resolution window W2. Recall that the 9×9 window context W2 corresponds to a window of 72×72 pixels sub-sampled by 8 in each direction. Each square (pixel) in the 9×9 coarse resolution window W2 represents an extremum in a window of 8×8 original pixels (i.e., pixels at the original pixel resolution). The Dynamic Threshold module 320 uses these three predefined context areas in the process of determining the gray selector signal GRS.

The Single Pixel (current pixel) area is used when no contrast activity (described below) exists in both the 5×5 window W1 and 9×9 window W2, in which case the luminance of the incoming signal DSC is merely thresholded and the chroma (a, b) components are not used. Otherwise, the 5×5 High-Resolution and 9×9 Coarse Resolution areas are used in combination to track and segment the incoming signal DSC based on the level of activity in the windows. Activity in the 5×5 window indicates the presence of an image edge in that window. Activity in the 9×9 window indicates that an edge is either approaching the small window or leaving the small window. Thus, the large 9×9 window serves as a look ahead feature. It also provides the history of where an edge has been. This allows proper setting of the SEE signal (to be described later). The large 9×9 window could be replaced by other embodiment that serves the same purposes. The operation of tracking and segmenting the incoming signal DSC based on the level of activity in the windows will be described below.

Figure 8:
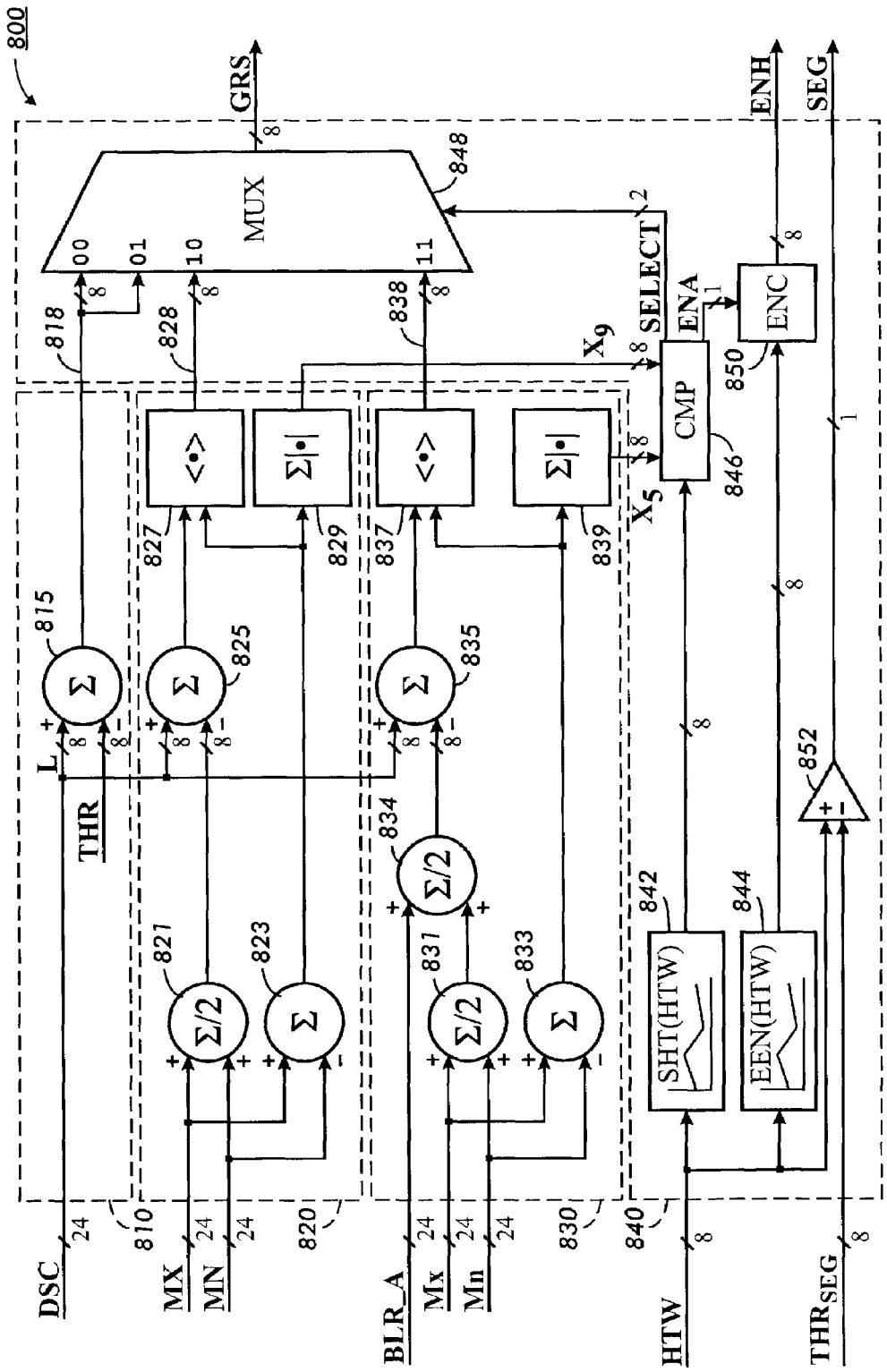
FIG. 8 shows the block diagram of one embodiment of the Dynamic Threshold module.

FIG. 8 shows a block diagram of an embodiment 800 of the Dynamic Threshold Module 320. The embodiment 800 comprises three logic blocks 810, 820, 830, and a decision module 840.

The three logic blocks 810, 820, 830 correspond to the three possible context windows shown in FIG. 7, i.e., the Single Pixel area, the 5×5 High-Resolution window W1, and the 9×9 Coarse Resolution window W2, respectively.

The multiplexer MUX can select and pass one of these outputs as the final GRS output signal. The selection can be switched on a pixel-by-pixel basis based on the 2-bit signal SEL. The actual selection code for each of the inputs is shown in FIG. 8 to the right of the input arrows.

For the case of a Single Pixel context, the luminance component of the incoming input signal DSC is merely biased by subtracting from it a pre-determined 8-bit constant THR, using the adder 815. The value of THR is stored in a programmable register so that it could be adjusted to accommodate the sensor calibration. For an ideal balanced incoming signal DSC that spans the full 8-bit luminance range, THR would be normally set to THR=128 in order to bias the luminance of DSC such that the output signal GRS will have zero mean and the incoming signal will be thresholded halfway across. However, the visual threshold may well be skewed away from the center due to the logarithmic response of the human visual system.

In addition, the scanner response may vary across the dynamic range, or may not even span the full 8-bit range. For example, the peak luminance value is determined by the brightest media reflectance, and the dark current of the sensor determines the output at low light levels. The value of the threshold register THR can be appropriately adjusted to account for the above considerations and better match the desired GRS response. In any case, only the luminance component of the incoming signal DSC is used for this biasing.

The logic block 820 is used to address the 9×9 coarse resolution window context W2 shown in FIG. 7. The inputs to the logic block 820 are the full-color coarse minimum value MN and maximum value MX from the Dependent Max and Min blocks E3 and E4, respectively. Recall that these values were generated by sub-sampling the outputs of the Dependent Min-Max block E1 by a factor of 8 in both directions and then searching for the minimum and maximum (i.e., minimum of minima and maximum of maxima) over a 9×9 window. The operation of the logic block 820 is equivalent to performing the scaled dot product of the following two vectors X and Y:

$$\text{output } 828 = \langle X, Y \rangle; \qquad (1)$$

where <X, Y> is the scaled dot product of the two vectors X and Y:

$$\langle X, Y \rangle = (X_L, X_a, X_b)(Y_L, Y_a, Y_b)^t = X_L Y_L + X_a Y_a + X_b Y_b; \quad (2)$$

where $$X = MX - MN = \begin{bmatrix} L_{MX} - L_{MN} \\ a_{MX} - a_{MN} \\ b_{MX} - b_{MN} \end{bmatrix}; \quad (3)$$

and $$Y = DSC - (MX + MN)/2 = \begin{bmatrix} L - (L_{MX} + L_{MN})/2 \\ a - (a_{MX} + a_{MN})/2 \\ b - (b_{MX} + b_{MN})/2 \end{bmatrix}; \quad (4)$$

The (L, a, b) values in equation (4) are the corresponding color components of the incoming signal DSC. The X vector in equation (3) is the vector difference between the maximum value MX and the minimum value MN. The Y vector in equation (4) is the incoming signal DSC minus the average of the minimum MN and maximum MX values, the average being the 3D midpoint between MN and MX. By taking the scaled dot product of these two vectors, the output is proportional to the relative distance from the plane that is perpendicular to the X vector and crosses it halfway along. Since the sought-after information is the location of the zero-crossing, the precise magnitude of the dot product is not required. Therefore, the result is divided by an arbitrary factor of 256 (shift right by 8) to scale it back to fit the 8-bit range.

However, since the logic block 820 output (to multiplexer 848) may still occasionally overflow the 8-bit range (by a factor of roughly 3, or 1.5 bits), additional logic may be used to limit the logic block 820 output to 255 if it gets larger than 255.

A scalar measure for the overall contrast magnitude ×9 within the coarse resolution 9×9 window is generated by adding together the absolute values of the three components of the vector X within the summation block 829:

$$X_9 = L_X + |a_X| + |b_X| \quad (5)$$
$$= L_{MX} - L_{MN} + |a_{MX} - a_{MN}| + |b_{MX} - b_{MN}|;$$

Referring to equation (5), there is no need to take the absolute value of the luminance component L since L is confined to the positive range [0 . . . 255]. The implementation of equations (1) through (5) for the logic block 820 is straight-forward. Referring to logic block 820 in FIG. 8, the first two adders 821, 823 perform the vector sum and difference of the 3×1 input signals MX, MN, on a component by component basis. The adder 821 that handles the sum also divides the result by 2 (by shifting it right by 1 position) to obtain the average as indicated by the symbol Σ/2. Adder 823 outputs the vector difference X (defined in equation (3)) to block 829. Block 829 computes the sum of absolute values of the three components of the vector X and generates the contrast magnitude $X_9$. Adder 825 calculates the vector Y in equation (4) by performing the vector difference between the input signal DSC and the output from adder 821. The X and Y vector components are then multiply-and-added together, element by element, to form the dot product in the dot product block 827. The output 828 of block 827 is described by equations (1) and (2).

Figure 16:
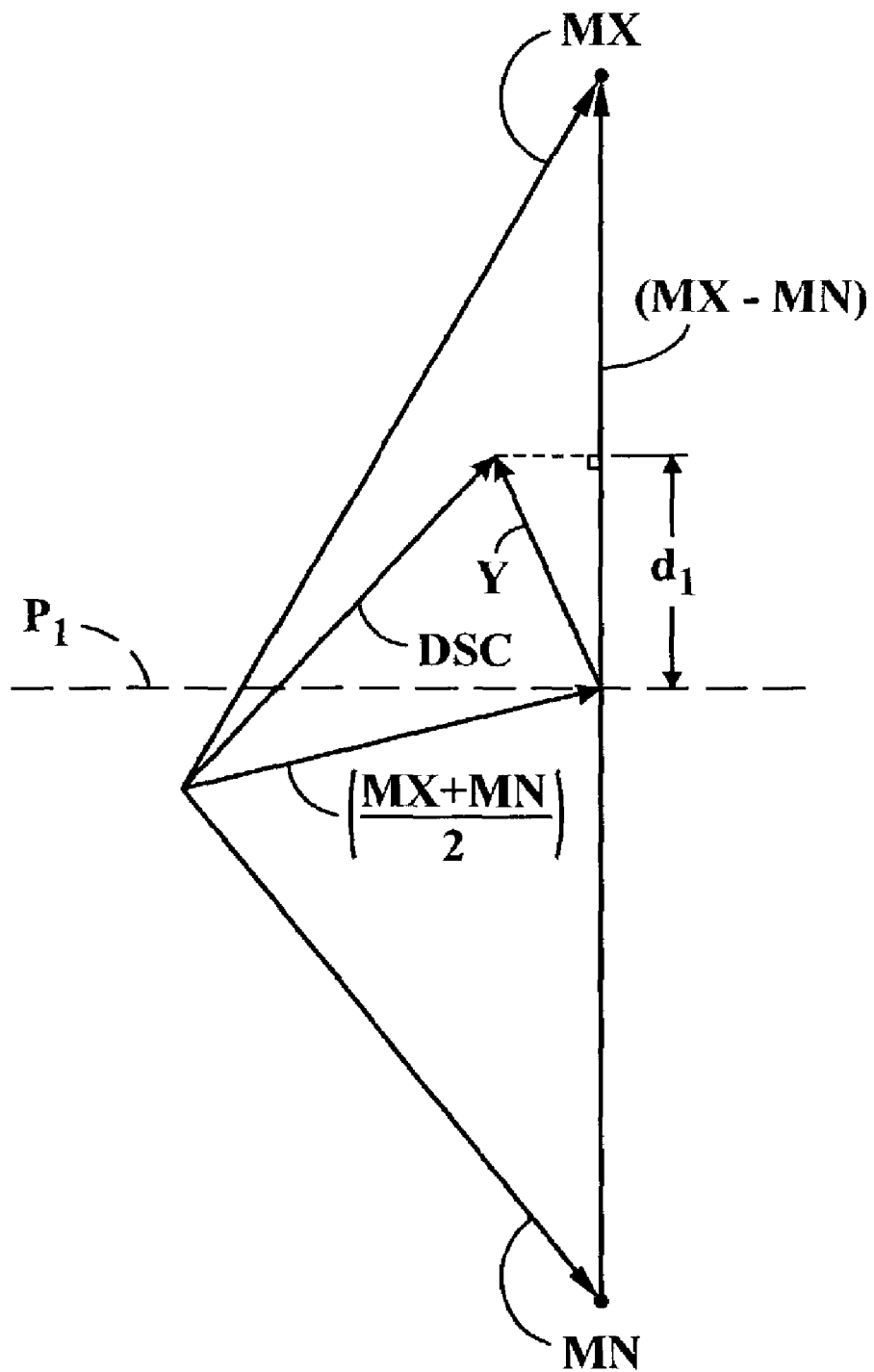
FIG. 16 is a graphical illustration of equations (1) through (4).

FIG. 16 is a graphical illustration of equations (1) through (4). In FIG. 16, the origin of the three-dimensional space is assumed to be on the left hand side, as shown. The vectors MX, MN represent the three-dimensional points MX and MN, respectively. The current image pixel is represented by the vector DSC. As illustrated, the vector X=(MX−MN) and the vector Y result from vector operations in accordance with equations (3) and (4). The value $d_1$ represents the result of taking the dot product of X and Y. This value is the projection of Y onto X. This value also indicates the distance and "direction" of the point represented by the vector Y with respect to the plane PI. The plane $P_1$ is orthogonal to the vector X=MX−MN at the midpoint of X. By "direction" of the point represented by vector Y, it is meant whether this point is above or below the plane $P_1$. The plane $P_1$ represents the threshold plane. The indicator value $d_1$ indicates whether, after thresholding, the current image pixel DSC is above or below the threshold plane, that is, whether it is closer to MX or to MN, and by how much. This indicator value $d_1$ allows a decision to be made regarding segmentation of the current pixel. For example, if the thresholded pixel is very close to MX (respectively, MN), a decision can be made that the current pixel be included in the Foreground plane (respectively, Background plane). If the thresholded pixel is too close to the threshold plane, a decision can be made that the current pixel be included in both the Foreground and Background planes.

Referring to FIG. 8, the logic block 830 is used to address the 5×5 high-resolution window context W1 shown in FIG. 7. The inputs to the logic block 830 are the full-color minimum and maximum values Mn, Mx from the Dependent Min-Max module E1. The operation of the logic block 830, in forming a scaled dot product, is similar to the logic block 820 described above.

The operation of the logic block 830 is equivalent to performing the scaled dot product of the following two vectors:

$$\text{output } 838 = \langle X', Y' \rangle; \quad (6)$$

where <X', Y'> is the scaled dot product between the two vectors X' and Y':

$$\langle X', Y' \rangle = (X'_L, X'_a, X'_b)(Y'_L, Y'_a, Y'_b)^t \quad (7)$$
$$= X'_L Y'_L + X'_a Y'_a + X'_b Y'_b;$$

where $$X' = Mx - Mn = \begin{bmatrix} L_{Mx} - L_{Mn} \\ a_{Mx} - a_{Mn} \\ b_{Mx} - b_{Mn} \end{bmatrix}; \quad (8)$$

and $$Y' = DSC - [BLR\_A + (Mx + Mn)/2]/2 \quad (9)$$
$$= \begin{bmatrix} L - [L_A + (L_{Mx} + L_{Mn})/2]/2 \\ a - [a_A + (a_{Mx} + a_{Mn})/2]/2 \\ b - [b_A + (b_{Mx} + b_{Mn})/2]/2 \end{bmatrix};$$

The (L, a, b) values in equation (9) are the corresponding color components of the incoming signal DSC. The X' vector in equation (8) is the vector difference between the maximum vector Mx and the minimum vector Mn. The Y' vector in equation (9) is the incoming signal DSC minus the average of the minimum Mn and maximum Mx values, the average being the 3D midpoint between Mn and Mx. By taking the scaled dot product of these two vectors, the output is proportional to the relative distance from the plane that is perpendicular to the X' vector and crosses it halfway along. Since the sought-after information is the location of the zero-crossing, the precise magnitude of the dot product is not required. Therefore, the result is divided by an arbitrary factor of 256 (shift right by 8) to scale it back to fit the 8-bit range.

However, since the logic block 830 output (to multiplexer 848) may still occasionally overflow the 8-bit range (by a factor of roughly 3, or 1.5 bits), additional logic may be used to limit the logic block 830 output to 255 if it gets larger than 255.

A scalar measure for the overall contrast magnitude ×5 within the fine resolution 5×5 window W1 (FIG. 7) is generated by adding together the absolute values of the three components of the vector X' within the summation block 839:

$$X_5 = L_{X'} + |a_{X'}| + |b_{X'}| \qquad (10)$$
$$= L_{Mx} - L_{Mn} + |a_{Mx} - a_{Mn}| + |b_{Mx} - b_{Mn}|;$$

Referring to equation (10), there is no need to take the absolute value of the luminance component L since L is confined to the positive range [0 . . . 255]. The implementation of equations (6) through (10) for the logic block 830 is straightforward. Referring to logic block 830 in FIG. 8, the first two adders 831, 833 perform the vector sum and difference of the 3×1 input signals Mx, Mn, on a component by component basis. The adder 831 that handles the sum also divides the result by 2 (by shifting it right by 1 position) to obtain the average as indicated by the symbol Σ/2. Adder 833 outputs the vector difference X' (defined in equation (8)) to block 839. Block 839 computes the sum of absolute values of the three components of the vector X' and generates the contrast magnitude $X_5$. Adder 834 adds the vector signal BLR_A to the vector output of adder 831 and divides the result by 2. Adder 835 calculates the vector Y' in equation (9) by performing the vector difference between the input signal DSC and the output from adder 834. The X' and Y' vector components are then multiply-and-added together, element by element, to form the dot product in the dot product block 837. The output of block 837 is described by equations (6) and (7).

It is important to note that the architecture of logic block 830 differs from that of logic block 820 by having the added threshold-biasing feature that enhances dark or light thin lines by "nudging" the threshold towards the Super-Blur reference signal BLR_A=($L_A$, $a_A$, $b_A$) when BLR_A is available. This is accomplished by averaging the Super Blur signal BLR_A with the averaged Mx and Mn values, to form the alternative Y' vector, as shown in equation (9).

Figure 17:
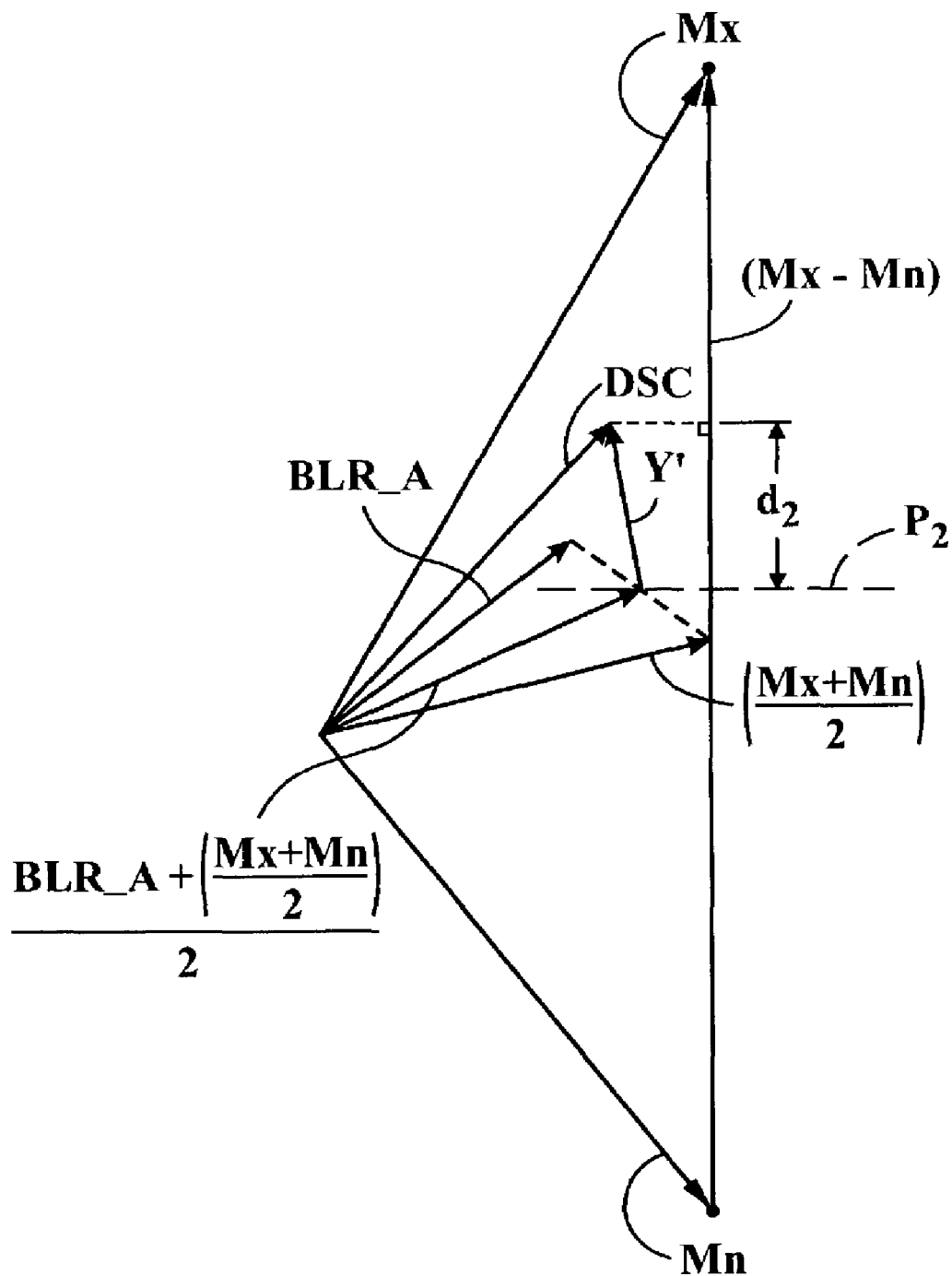
FIG. 17 is a graphical illustration of equations (6) through (9).

FIG. 17 is a graphical illustration of equations (6) through (9). In FIG. 17, the origin of the three-dimensional space is assumed to be on the left hand side, as shown. The vectors Mx, Mn represent the three-dimensional points Mx and Mn, respectively. The current image pixel is represented by the vector DSC. The Super-Blur reference signal BLR_A is represented by the vector BLR_A. As illustrated, the vector X'=(Mx−Mn) and the vector Y' result from vector operations in accordance with equations (8) and (9). The value $d_2$ represents the result of taking the dot product of X' and Y'. This value is the projection of Y' onto X'. This value also indicates the distance and "direction" of the point represented by the vector Y' with respect to the plane $P_2$. The plane $P_2$ is orthogonal to the vector X=MX−MN at a point away from the midpoint by a small amount. This amount represents the added threshold-biasing feature discussed in the preceding paragraph. By "direction" of the point represented by vector Y', it is meant whether this point is above or below the plane $P_2$. The plane $P_2$ represents the threshold plane. The indicator value $d_2$ indicates whether, after thresholding, the current image pixel DSC is above or below the threshold plane, that is, whether it is closer to Mx or to Mn, and by how much. This indicator value $d_2$ allows a decision to be made regarding the segmentation of the current pixel. For example, if the thresholded pixel is very close to Mx (respectively, Mn), a decision can be made that the current pixel be included in the Foreground plane (respectively, Background plane). If the thresholded pixel is too close to the threshold plane, a decision can be made that the current pixel be included in both the Foreground and Background planes.

Referring to FIG. 8, the decision module 840 receives the output 818 from logic block 810, output 828 and contrast magnitude output $X_9$ from logic block 820, output 838 and contrast magnitude output $X_5$ from output block 830.

The decision module 840 comprises a comparator logic 846, a multiplexer 848, an enhancement coding block 850, and a comparator 852. The decision module 840 also includes two parameterized piecewise linear function blocks 842 and 844 to process the halftone weight signal HTW when it is available from a de-screener system.

The comparator logic 846 receives the contrast magnitude outputs $X_5$ and $X_9$, outputs the select signal SEL to control the output GRS of multiplexer 848, and outputs the enable signal ENA to control the enhancement signal ENH of the enhancement logic 850. The comparator logic 846 may also use the 8-bit Halftone Weight frequency estimate HTW, when available, from a de-screener system, after the estimate HTW has passed through a parameterized piecewise linear function block 842.

Note that, by definition of the min-max operations described previously, the contrast magnitude of the larger 9×9 (sub-sampled) window W2 must be equal or larger than the contrast magnitude of the smaller 5×5 high-resolution window W1. In other words:

$$X_9 \geq X_5; \qquad (11)$$

This is due to the fact that, for a larger window that includes a smaller one, the maximum can only be larger and the minimum smaller than those of the smaller window. Furthermore, as the segmentation process proceeds from one pixel to the next (in the fast scan direction), the $X_9$ contrast value remains the same for 8 consecutive pixels until the next pixel crosses the 8×8 window boundaries into the next non-overlapping window. The ×5 contrast value, on the other hand, may change on a pixel by pixel basis. This behavior is due to the 8× sub-sampling performed by the Dependent Min-Max Sub-Sample block E2.

Figures 9, 10:
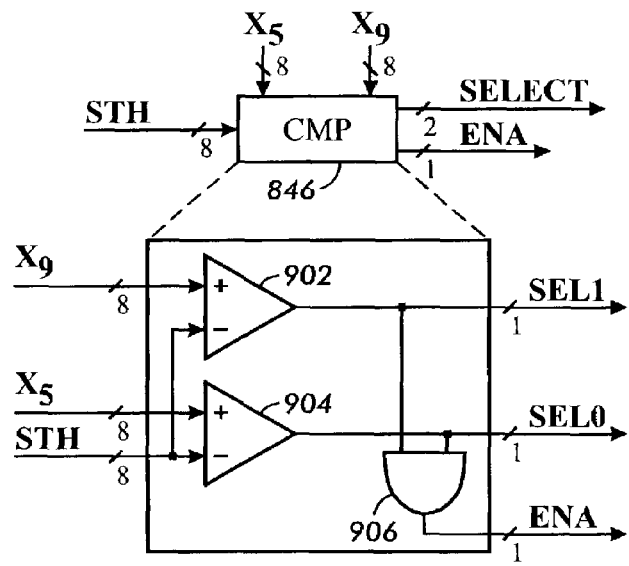
FIG. 9 shows an implementation of the comparator logic block included in one embodiment of the Dynamic Threshold module.
FIG. 10 shows the truth table of the comparator logic block of FIG. 9.

FIG. 9 shows the block diagram of an embodiment of the comparator logic 846. The two contrast magnitude measures $X_5$ and $X_9$ are compared to the signal STH, via comparators 904, 902, respectively, to generate the selection bits SEL0 and SEL1, respectively. The bits SEL0 and SEL1 form the 2-bit select signal SELECT. If the halftone weight HTW is available, HTW is passed through the piecewise linear function block 842 to produce STH. Otherwise, STH is set to a predetermined value. The two bits SEL0 and SEL1 are then combined together by AND gate 906 to generate the 1-bit enhancement enable signal ENA.

FIG. 10 shows the equivalent Truth Table for the comparator logic. If the contrast measure $X_9$ of the larger 9×9

(sub-sampled) window W2 is smaller than STH, then, regardless of the contrast measure $X_5$ of the smaller 5×5 window W1, the SEL1 bit is cleared and the SELECT signal is either 0 or 1. This causes the multiplexer 848 to select the Single Pixel context output 818 (FIG. 8). If, however, there is some activity in the larger 9×9 window W2 but not within the smaller 5×5 window W1, the SELECT signal is set to equal 2 (binary "10"). This causes the multiplexer 848 to select in the logic block 820 output 828. If both windows show significant contrast magnitude, the SELECT signal is set to 3, resulting in the output 838 of logic block 830 (corresponding to the 5×5 high-resolution window) being selected by the multiplexer 848. In addition, when the SELECT signal is 3, the binary enable signal ENA is turned on. The signal ENA is used to enable the enhancement block 850 to output the segmentation enhancement signal ENH.

Referring to FIG. 8, the enhancement coding block 850 also uses a linear function of the Halftone Weight frequency estimate HTW to produce the signal ENH which controls the amount of segmentation enhancement to be applied in the FG/BG Separation block E8 (FIG. 3). The HTW signal is fed to the parameterized piecewise linear function block 844 which applies a piecewise linear function EEN to the signal HTW, and outputs the resulting signal to the enhancement coding block 850. The binary enhancement enable signal ENA from the comparator logic 846 is used for gating (i.e., enabling) the enhancement signal ENH as follows. If ENA=1, then the block 844 output signal is passed through to the output ENH; otherwise, all of the ENH bits are forced to zero (disabled). The 8-bit ENH output signal communicates the amount of segmentation enhancement to be applied in the FG/BG Separation block E8.

Referring to FIG. 8, the comparator 852 compares the optional halftone weight HTW with a predefined threshold $THR_{SEG}$ and generates the optional binary signal SEG. The optional binary signal SEG provides a means to control the segmentation function of the FG/BG Separation block E8. The binary signal SEG is turned on when HTW is larger than $THR_{SEG}$. When SEG is on, the segmentation in the FG/BG Separation block E8 is performed in accordance with equations (14), (15), (16), (17). The binary signal SEG is turned off when HTW is smaller than or equal to $THR_{SEG}$. When SEG is off, the segmentation in the FG/BG Separation block E8 is performed in accordance with equations (18), (19), (20). The value of the 8-bit $THR_{SEG}$ may be programmable via a register.

Referring to FIG. 3, the Selector Logic block E6 converts the 8-bit grayscale selector input GRS to the binary Selector plane output SEL which could be at a different resolution relative to the input image signal DSC. For high-quality text and line art, the binary Selector output SEL is typically kept at a higher resolution than the Background and Foreground planes. For example, the embodiment 300 uses twice the resolution, so that, for a standard 600-dpi scanner, the output resolution of the binary SEL signal is normally set at 1200 dpi. The Selector Logic block E6 interpolates the gray selector input GRS to the higher resolution and thresholds the resulting interpolated signal to generate the binary output SEL which forms the Selector plane.

Figure 11:
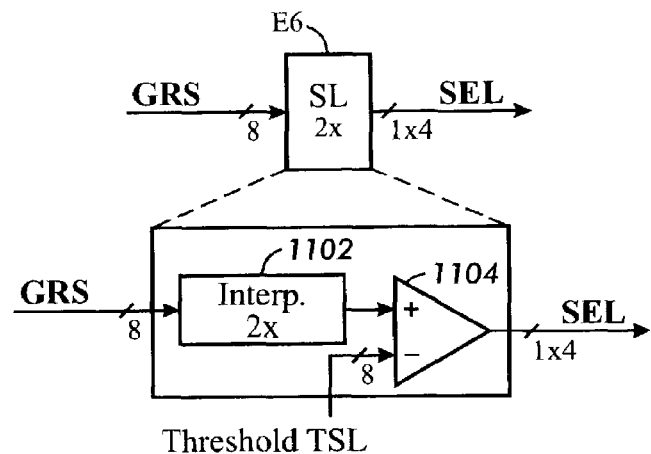
FIG. 11 shows an implementation of the selector logic module included in one embodiment of the Dynamic Threshold module.

FIG. 11 shows the block diagram of the Selector Logic block E6. The Selector Logic block E6 comprises an interpolator 1102 and a comparator 1104. The interpolator 1102 interpolates the 8-bit gray selector input signal GRS in the gray domain using a two-dimensional bilinear interpolation scheme. The interpolation factor may be programmable under software control. In the embodiment 1102 shown in FIG. 11 (and FIG. 3), the interpolation factor is set to the default setting of 2×. The output from the interpolator 1102 is fed to the comparator 1104, which thresholds it against a value TSL, and outputs the resulting binary output as the Selector signal SEL. The value of the threshold TSL is stored in a programmable register so that it can be changed from one page of a document to the other. For an ideal signed gray selector signal GRS that spans the full 8-bit luminance range, the value TSL would be normally set to the mid-point TSL=0 to threshold the incoming signal halfway across. However, as explained previously for the signal THR in block 810 (FIG. 8), the actual TSL value may be set differently in order to compensate for the actual dynamic range of the scanner sensor and/or the properties of the human visual system.

Note that for the current 2× interpolation-factor, the binary SEL output data rate is twice as fast as the image signal DSC in each direction. This means that for every 8-bit input GRS sample, the Selector Logic block E6 produces four binary output SEL samples.

It is important to note that a vector notation is used for the output SEL to indicate the higher output resolution. While the output SEL is still considered to be binary (that is, assuming the values of either 0 or 1 only), each incoming GRS input generates four Selector bits at the output (assuming the normal 2× interpolation factor). The output data rate is half the input rate, since one 8-bit value is converted to four 1-bit values.

Referring to FIG. 3, the Edge Processing block E7 receives the high resolution Selector output SEL and counts the number of on and off pixels in a 5×5 high-resolution window centered on the current pixel of interest. The Edge Processing block E7 outputs the two-bit signal SEE. The SEE signal is set to 0 if all of the input pixels inside the window are 0 (corresponding to a constant 3×3 original input resolution Background area). Similarly, the SEE signal is set to 3 if all of the input pixels inside the window are 1 (corresponding to a constant 3×3 original input resolution Foreground area). In addition, the SEE output is set to either 1 or 2 if the content of the 3×3 window is mostly Background (white) or mostly Foreground (black), respectively.

Figure 12:
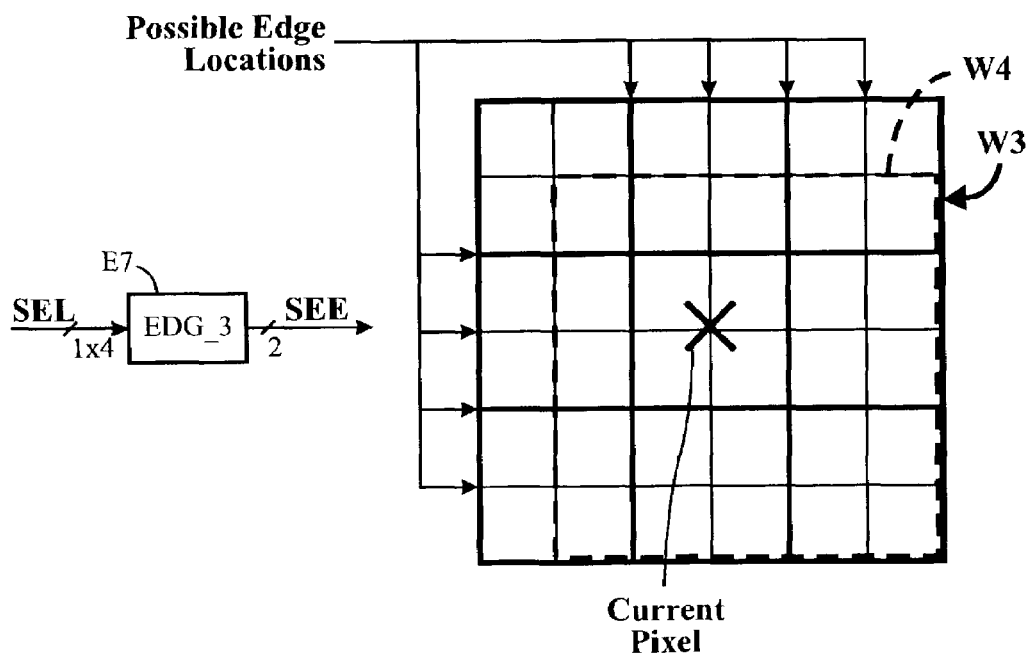
FIG. 12 illustrates the function of the Edge Processing block included in the Separation module.

FIG. 12 illustrates the function of the Edge Processing block E7. The operation of block E7 is as follows. The Edge Processing block receives as input the binary Selector signal SEL, which is at higher resolution (normally 2×) relative to the source input signal DSC. The Edge Processing block E7 maintains a 3×3-pixel context window W3 (at the original input resolution) centered at the current pixel of interest. Since the Selector signal SEL is at twice the original resolution, each of the elements in the 3×3-pixel window W3 contains four of the high-resolution binary SEL samples as shown in FIG. 12. The thicker lines represent the original DSC resolution, which corresponds to a 6×6-pixel context window in the high-resolution domain. However, only the dot content of 5×5 high-resolution pixel area W4 (shown in dashed lines) is used; the area between W3 and W4 is excluded from the edge processing.

The 5×5 high-resolution context W4 is designed for "detecting" potential edges in the proximity of the current pixel of interest. The window pattern W4 uses a full context of 2 high-resolution pixels extending below and to the right of the current pixel, but only one high resolution pixel extending to the top or to the left. This window pattern prevents any edge from overlapping with the neighboring pixels, that is, no potential edge location could be detected (i.e., shared) more than once, in association with multiple lower resolution pixels. The 4×4=16 possible edge locations within the current window of interest are indicated in FIG. 12.

The Edge Processing block E7 counts the number of high-resolution pixels that are currently turned on in the 5×5 high-resolution area W4. This number can range from 0 to 25. It is mapped to the output 2-bit signal SEE of the Edge Processing block as following:
1. SEE=0 if the 5×5 count was 0 (no Foreground pixels found);
2. SEE=1 if the count was in the range [1 . . . 12] inclusive (mostly Background pixels);
3. SEE=2 if the count was in the range [13 . . . 24] inclusive (mostly Foreground pixels);
4. SEE=3 if the count was 25 (only Foreground pixels found);

The 2-bit output signal SEE is forwarded to the FG/BG Separation block E8. It is noted that this signal is at the original input resolution (typically, 600 dpi), although the Selector signal is at the higher resolution of double the original input resolution (for this example, 1200 dpi).

The FG/BG Separation block E8 splits the incoming image signal DSC into the Foreground and Background planes. The block uses the full-color minimum and maximum (Mn, Mx) outputs from the Dependent Min-Max block E1, as well as the 2-bit Selector edge count signal SEE from the Edge Processing block E7. In addition, the FG/BG Separation block can also enhance the lifting of edges via the segmentation enhancement control signal ENH received from the Dynamic Threshold Module 320. As discussed previously, the segmentation process in the FG/BG Separation block E8 can be controlled by the optional binary signal SEG.

The FG/BG Separation block E8 outputs two full-color rough initial estimates Fgr and Bgr of the Foreground and Background outputs, respectively. The subsequent module, the FG/BG Cleanup block E9, further processes the estimates Fgr and Bgr to produce the final Foreground and Background outputs.

The FG/BG Separation block E8 takes in the full-color source signal DSC to be segmented and produces values for one of the Fgr and Bgr outputs, or sometimes for both. The FG/BG Separation block E8 reserves the special code of zero luminance and chroma (L=a=b=0) to indicate an empty (undefined) pixel in either the Foreground estimate Fgr or the Background estimate Bgr. As the process continues across the page, some of the Foreground and Background pixels will remain undefined. The FG/BG Cleanup block will then carefully fill in the values for these undefined pixels to keep the compression low and to prevent potential subsequent sub-sampling and JPEG compression artifacts.

Figure 13:
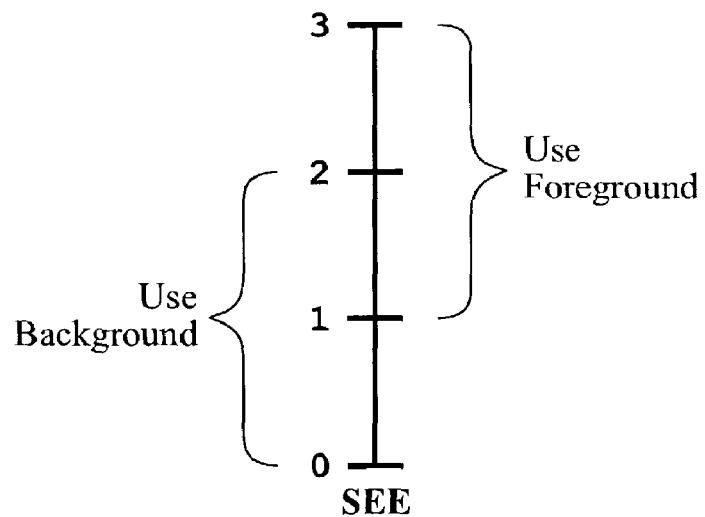
FIG. 13 illustrates the decision range used by the Separation module for separating the image signal into the Background and Foreground planes.

FIG. 13 illustrates the decision range used by the FG/BG Separation block E8 for separating the image signal into the Background and Foreground planes. The FG/BG Separation block uses the value of the 2-bit Selector edge count signal SEE from the Edge Processing block E7 to determine whether to use the Background, Foreground, or both. The Foreground is used if $SEE \geq 1$, and the Background is used if $SEE \leq 2$. Since these two cases are not mutually exclusive, both the Foreground and Background are used simultaneously when $1 \leq SEE \leq 2$.

The following two full-color quantities (the purpose of which will be detailed below) are defined:

$$FGD = LIM[DSC + (Mn - DSC)(ENH/255)]; \quad (12)$$

$$BGD = LIM[DSC + (Mx - DSC)(ENH/255)]; \quad (13)$$

where DSC is the full-color input signal, Mn and Mx are the dependent minimum and maximum outputs from the Dependent Min-Max block E1, and ENH is the 8-bit segmentation enhancement signal from the Dynamic Threshold Module 320. The limit function LIM is used to restrict the result to the 8-bit range [1 . . . 255] for each of the components, thus excluding the special code of zero that is reserved for marking undetermined pixels. Note that since DSC and Mn or Mx are full-color (L, a, b) vectors, the operations are in 3D space.

For the case of using the Foreground during segmentation, that is, when SEE={1, 2, 3} and SEG=1, the output Fgr value is determined to be:

$$Fgr = FGD, \text{ if } SEG=1 \text{ AND } SEE=\{1, 2, 3\}; \quad (14)$$

$$Fgr = 0 \text{ if } SEG=1 \text{ AND } SEE=0; \quad (15)$$

When the control signal SEG is on (SEG=1) and the Foreground is not used (i.e., when SEE=0), the Foreground pixel value is marked as undefined by setting its value to the special code Fgr=0 (for all of the three components), per equation (15). Note that, in one implementation, ENH is extended to a 9-bit representation and its value is incremented by 1 to allow normalization by 256 instead of 255, thus replacing the unnecessary division with a simple shift right by 8 positions.

As shown in equations (14) and (12), the Foreground estimate Fgr value is interpolated (in 3D space) between the current input signal value DSC and the minimum value Mn of the Dependent Min-Max block E1, depending on the amount of segmentation enhancement expressed by the 8-bit signal ENH. When ENH=0, no enhancement will be done and the output will be set to the input signal Fgr=DSC. As previously discussed, this would be the common case unless there would be sufficient contrast activity in both the 5×5 fine resolution window W1 and 9×9 coarse resolution window W2. Equivalently, when ENH=255 (corresponding to maximum enhancement), the output will be set to the minimum signal Fgr=Mn. This would normally represent the case of a pixel in the immediate vicinity of an edge, where it would be advantageous to enhance the edge by painting the Foreground darker by as much as possible, as given by the minimum value in the neighborhood (0=black). In general, the amount of segmentation enhancement ENH can vary between the above two extremes, and the output Foreground values will be correspondingly weighted between the DSC and Mn values.

Similarly, for the case of using the Background during segmentation, i.e., when SEG=1 and SEE={0, 1, 2}, the output Bgr value is determined by the following equations:

$$Bgr = BGD \text{ if } SEG=1 \text{ AND } SEE=\{0, 1, 2\}; \quad (16)$$

$$Bgr = 0 \text{ if } SEE=3; \quad (17)$$

The output Bgr value will vary between the input DSC and Mx values in proportion to the amount of segmentation enhancement ENH, as given by equation (13). Equation (16) is similar to equation (14), with the exception of using the maximum Mx instead of the minimum Mn (see also equations (12) and (13)), and the different range of SEE. The use of Mx for the Bgr output will make it become visually lighter rather than darker as was the case for the use of Mn for the Foreground estimate Fgr.

Also, as indicated by equation (17) and corresponding with (15), when the Background is not used (i.e., when SEE=3), the Background value is marked as undefined by setting its value to the special code Bgr=0 (for all of the three components L, a, b).

In the case where the optional segmentation control is turned off (i.e., SEG=0), the Background is arbitrarily set to be a special code, regardless of the input pixel value:

$$Bgr=0, \text{ if } SEG=0; \tag{18}$$

and the Foreground is set to be one of the following:

$$Fgr=BGD, \text{ if } SEG=0 \text{ AND } SEE=\{0, 1\}; \tag{19}$$

$$Fgr=FGD, \text{ if } SEG=0 \text{ AND } SEE=\{2, 3\}; \tag{20}$$

Equations (18), (19), (20) show that the Background is always set to the special undefined marker Bgr=0, and the Foreground takes on the value of the weighted Foreground or Background pixel of (12) or (13), depending on the value of SEE. If SEE={0, 1}, the Background is used, otherwise the Foreground used.

It is important to note that the range of SEE for this case, where the optional segmentation control is turned off, is different than what was used in equations (14) through (17). Here the Foreground value is simply set to FGD if most of the pixels are foreground (SEE={0, 1}), or to BGD if they are mostly background (SEE={2, 3}).

The output from the FG/BG Separation block E8 is the two partially filled full-color planes Fgr and Bgr. Away from the edges in the Selector plane SEL, typically only one of the Foreground or Background outputs will contain the current pixel color (possibly enhanced), depending on whether it was light or dark. But near the edges, however, information might be carried in both the Foreground and Background channels simultaneously.

The FG/BG Cleanup block E9 applies additional processing on the rough Foreground and Background estimates Fgr and Bgr to generate the final Foreground and Background outputs FG and BG. The processing done by the FG/BG Cleanup block E9 is to slightly extend the Foreground and Background values beyond edges and also fill the undefined pixels in the Foreground and Background planes. The purpose of this processing is to prevent artifacts that may result from a subsequent sub-sampling and data compression (such as JPEG) and fill in the undefined pixels to achieve good compression ratio.

An additional logic inside the FG/BG Cleanup block E9 also monitors the Foreground and Background output values to detect and flag constant all-black or all-white tiles. Rather than encode the output from such tiles into the output data stream, a special tile marker is used and referenced as many times as needed. This will increase the overall compression ratio by eliminating the need to repeatedly encode the common all-white or all-black tiles.

Figure 14:
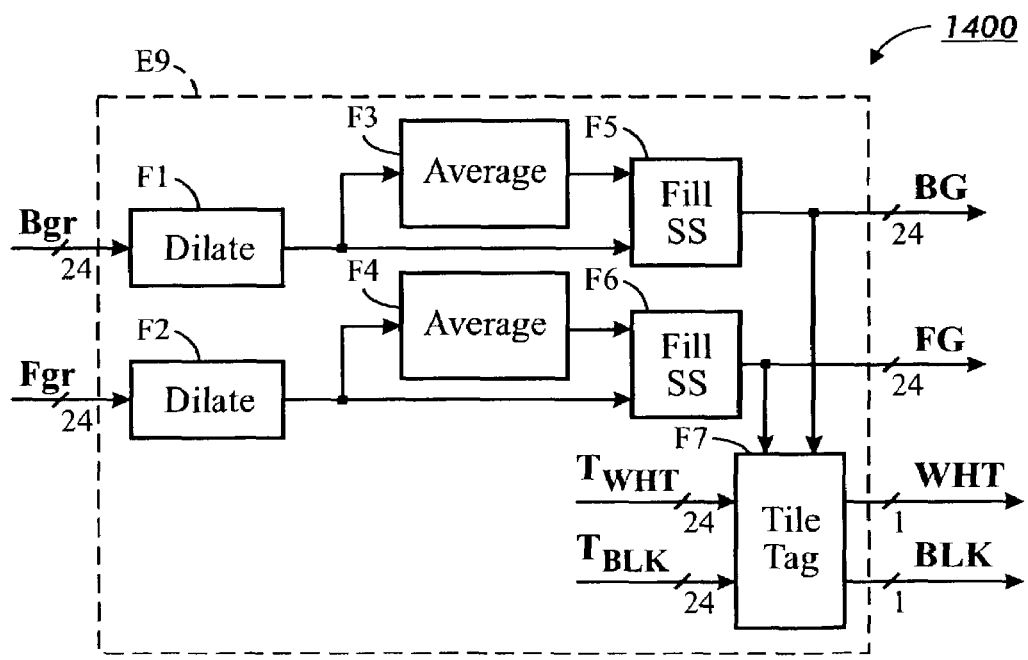
FIG. 14 shows a block diagram of one implementation of the FG/BG Cleanup block included in one embodiment of the Separation module.

FIG. 14 shows a block diagram of an embodiment of the FG/BG Cleanup block E9. The embodiment comprises two Dilate blocks F1, F2, two Averaging blocks F3, F4, two Fill/Sub-Sample blocks F5, F6, and a Tile Tag block F7.

The Dilate blocks F1 and F2 extend the defined content of the Foreground and Background inputs by two pixels. The extension by 2 pixels is done in anticipation of a subsequent 2× sub-sampling; other extension sizes could be used for different sub-sampling factors. The purpose is to increase the Foreground and Background overlap over edges so that the outcome is less sensitive to further sub-sampling.

Figure 15:
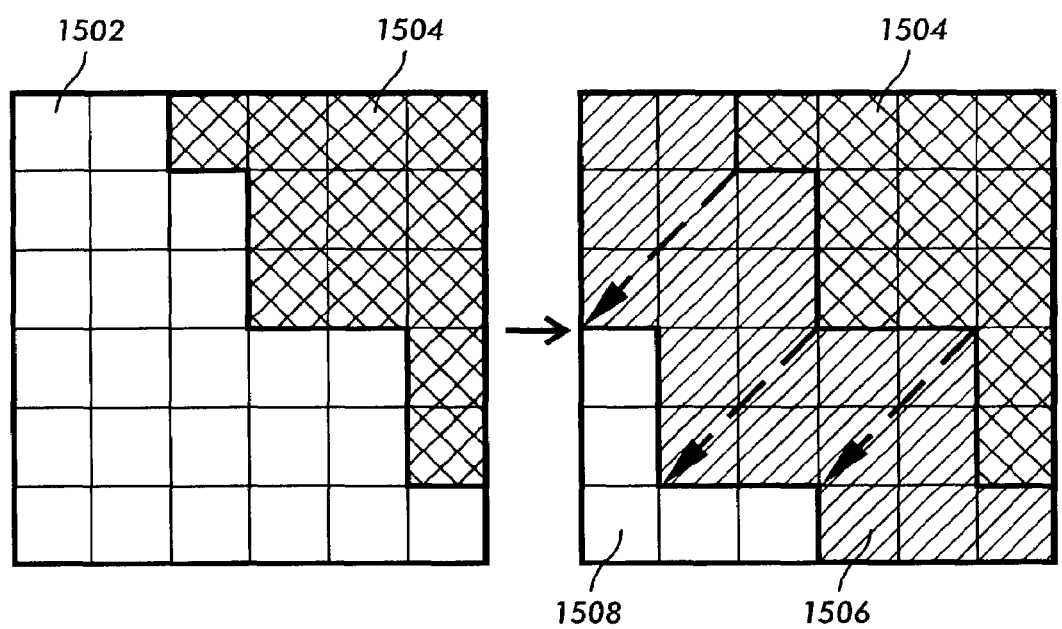
FIG. 15 illustrates the dilate operation used in one implementation of the FG/BG Cleanup block included in one embodiment of the Separation module.

FIG. 15 illustrates the effect of the dilate operation of Dilate blocks F1 and F2.

The area 1504 represents the defined pixels. The area 1502 represents the undefined pixels. After the dilate operation, the area of defined pixels is extended to cover also area 1506, and the area of undefined pixels is reduced to area 1508.

The operation of the Dilate blocks is achieved by using lowpass filters Fz_n. The n suffix indicates the number of the filter coefficients. In one embodiment, two-dimensional 5×5 triangular filters Fz_5 are used. The z suffix indicates that such filter eliminates any zero terms from the total normalization weight.

The general Fz_n filter equation is as follows:

$$\text{output value} = \frac{\sum a_{ij} * w_{ij}}{\sum w_{ij} * \delta(a_{ij})}; \tag{21}$$

where $a_{ij}$ are the 2D input values, $w_{ij}$ are the 2D filter coefficients, and $\delta(a_{ij})$ is defined as follows:

$$\delta(a_{ij})=1 \text{ if } a_{ij} \neq 0; \text{ otherwise } \delta(a_{ij})=0; \tag{22}$$

As can be seen from equation (21), an Fz_n filter differs from a regular filter in that the total weight is no longer just a known normalization constant. Since the number of incoming pixels having the value of zero is not known in advance, an ongoing accumulator for the weight must be kept. At the same time that the filter loop is operating, the content of the accumulator is increased by the value of the current filter coefficient if the corresponding input value is non-zero. Since the total weight is not fixed and known in advance, the final normalization of the filter output is dependent on the value of the total weight. However, it is still possible to avoid the division operation in equation (21) by using a predetermined multiplication table with multiple choices for the possible total weight values.

The purpose of using the special Fz_n filters is to eliminate any pixels marked as undefined with the special zero marker from contaminating the filtered output. Since the special marker value was selected to be zero, the undefined pixels do not affect the numerator in (17). However, the number of these undefined pixels must be tracked in order to keep the denominator accurate.

Whenever the filtered output of the Fz_5 filter in the Dilate block F1 (or F2) is non-zero (that is, at least one pixel within the 5×5 window centered on the current pixel of interest is non-zero, or fully defined), it replaces the special zero marker used for the undefined pixels. Note that the filtered outputs of the Fz_5 filters in the dilate blocks F1, F2 are only used for previously undefined pixels, and only affecting pixels within a two-pixel area in the immediate vicinity of an edge.

Referring to FIG. 14, the Averaging blocks F3 and F4 average the non-zero content of the diluted Foreground and Background values over JPEG MCU (Minimum Coded Units) blocks. These blocks have a size of 16×16 for a non sub-sampled output, and 32×32 if the output is sub-sampled by a factor of 2 in each direction (other sizes may be used for different sub-sampling factors). Again, the averaging is carefully done to exclude any undefined pixels that might otherwise bias the result. The averaging operation could be viewed in a similar manner to using Fz_n filters but with constant unity weight rather than triangular shapes. The Block Averages are performed on the fixed non-overlapping JPEG MCU block grid.

The Fill/Sub-Sample blocks F5 and F6 substitute the averaged Background and Foreground values received from the F3 and F4 units for the values of any remaining undefined pixels in the diluted Background and Foreground channels, respectively. With these substituted averaged values, the compression ratio is improved and further JPEG-ringing artifacts are largely prevented. Since the Background and Foreground channels are typically sub-sampled, the Fill/Sub-Sample blocks F5 and F6 also perform the sub-sampling operation as needed, and output the Background and Foreground signals BG, FG.

The Tile Tag block F7 monitors the values of the Foreground and Background channels over tiles and flags any tiles that effectively have all white or all black values. The tile sizes are programmable, but typical values vary from 64×64 to 512×512 pixels. A tile is considered to be all white if the absolute chroma values (i.e., both lal and lbl) of each and every pixel within the tile are smaller than given thresholds, and the luminance is larger than a given threshold. Similarly, a tile is considered to be all black if the absolute chroma values (i.e., both lal and lbl), as well as the luminance value, are all smaller than the given thresholds. The three thresholds above may be programmable using registers.

The following describes how the optional signal HTW can be generated from a Halftone Estimator module.

The Halftone Estimator module is used for measuring the frequency and halftone weight in a small area surrounding the current pixel of interest. The inputs to the Halftone Estimator module are the source signal SRC and an output BLR_3 from a small lowpass filter (e.g., having 3 coefficients). Both of these inputs are full-color (L, a, b) signals.

The Halftone Estimator module produces two monochrome (single-channel) output signals, FRQ and HTW, representing the estimated frequency and halftone weight, respectively. Each of these signals is represented by an 8-bit representation. HTW represents the level of confidence in the area being a halftone. If HTW is small (low confidence), active segmentation is turned off to prevent lifting of each and every halftone dot.

Figure 18:
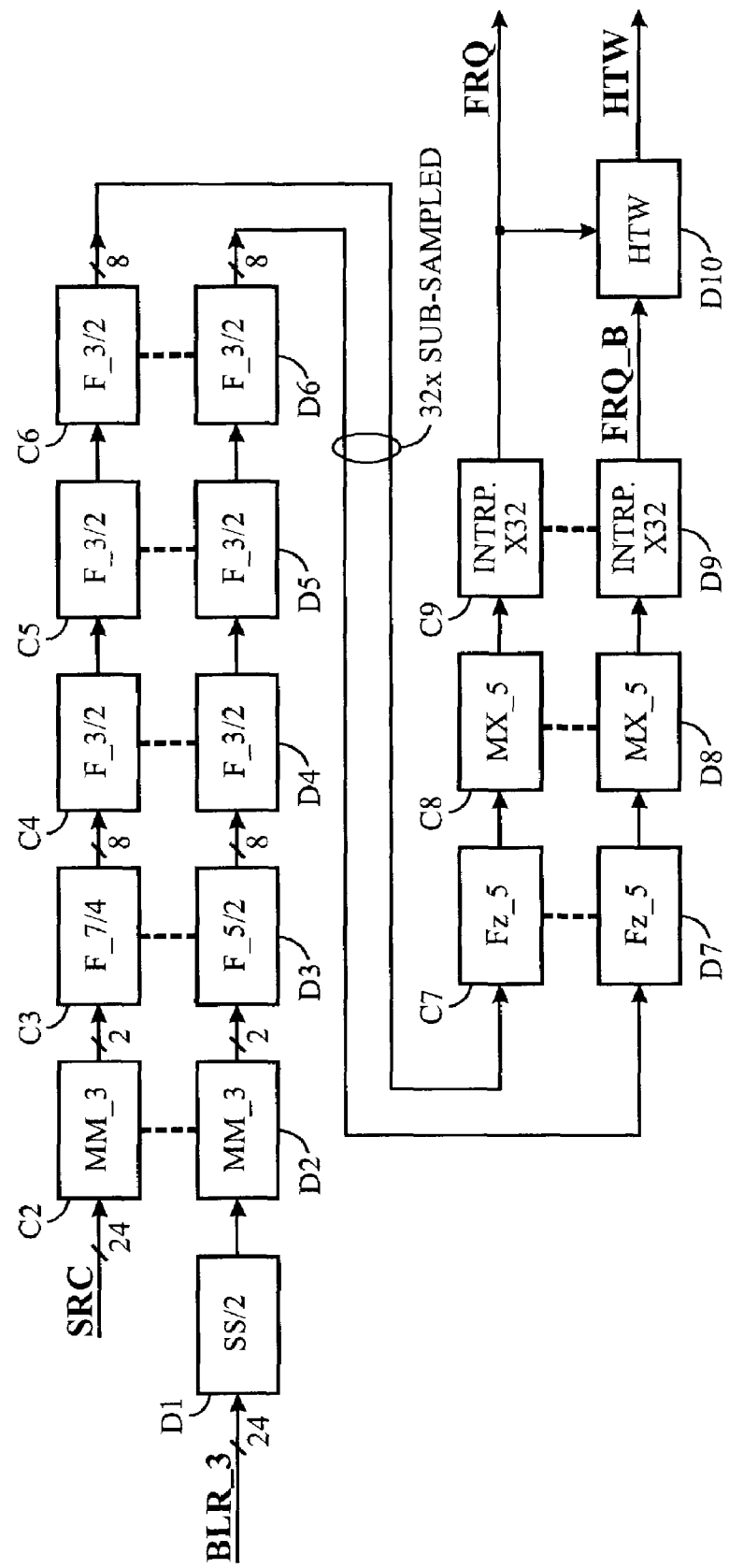
FIG. 18 shows an exemplary structure of the halftone estimate module.

FIG. 18 is a block diagram of an embodiment of the Halftone Estimator module.

As shown in FIG. 18, the embodiment of the Halftone Estimator module comprises two separate frequency detection channels operating concurrently, the outputs of which are combined together at the very last step to generate the halftone weight. Each frequency channel comprises a Min-Max texture detector (C2 and D2), followed by cascaded averaging filters. Most of the averaging filters also sub-sample the data by a factor of 2 at the same time (that is, only produce every other filtered value), so that the peak bandwidth is greatly reduced. Only at the very end the data is up-sampled back to the original resolution.

The notation in FIG. 18 is intended to emphasize the similarity between the two frequency channels by drawing the various blocks as matching pairs connected by the dotted lines (there is no actual connection).

Matching pairs of blocks are given the same block number, with the initial letter C for the original frequency channel and D for the blurred frequency channel. Matching pairs are therefore designated as (Cn, Dn), with n=[2, . . . , 9].

The notation used for the various block names is as following: the first number (underscored) denotes the size of the window used; the second number following the slash denotes the amount of sub-sampling that is done inside the block in each direction. Thus, for example, a filter designated B_3/2 indicates a blurring (lowpass) filter B with 3×3 window size, whose output is sub-sampled by a factor of 2 in both directions (that is, only one output is sent for every 2×2=4 input pixels).

The following provides a more detailed description of the various blocks included in the Halftone Estimate module.

The Sub-Sampling unit D1 is reducing the data rate by a factor of 4 by omitting every other pixel and line of the input. The sub-sampling is only needed in the blurred frequency channel D. No sub-sampling is needed for the full-resolution frequency channel C. The input to the SS/2 unit is the full-color (L, a, b) output signal BLR_3 from a small lowpass filter. The output of the SS/2 unit is a full-color (L, a, b) signal. The preferred sub-sampling method is to apply a simple pre-filter prior to sub-sampling in order to eliminate potential frequency aliasing problems.

The two identical Min-Max Detection modules C2, D2 are used for finding peaks and valleys in the input signal. By counting the number of peaks and valleys per unit area, a measure of the local frequency is obtained.

Each of the two Min-Max Detection units is taking as input a full-color (L, a, b) signal. Each unit utilizes three 3×3 windows to indicate when the center pixel of one of the color components is at an extreme value (either peak or valley) relative to its 8 neighbors, in accordance with the logic described below.

Each color component is independently examined in its own 3×3 window. The output from each Min-Max Detection unit is a 2-bit signal indicating the total number of color components that are in an extreme value state. This number could vary from zero (no color component was at an extremum) to 3 (all color components are at an extremum). When one or two color components are at an extremum, no distinction is made as to which ones are at an extremum; only the total number of components at an extremum is outputted.

Figure 19:
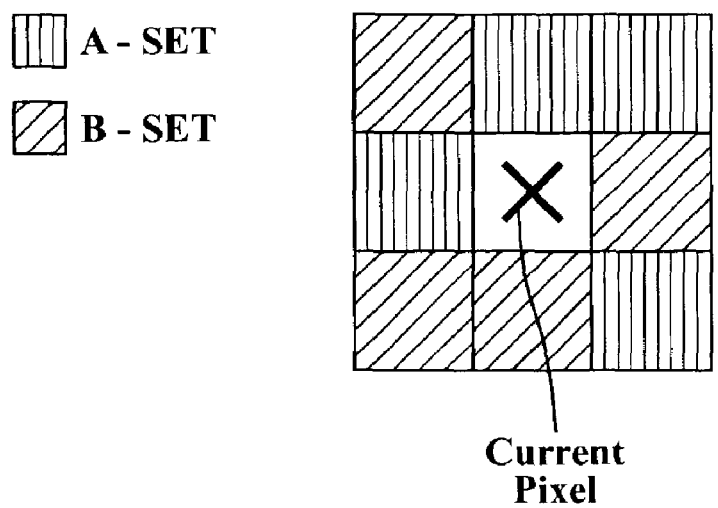
FIG. 19 shows a min-max detection scheme used by the min-max detection modules included in the halftone estimate module of FIG. 18.

FIG. 19 shows the Min-Max Detection structure. For each color component, the outer ring of 8 pixels surrounding the center pixel (the current pixel of interest) is first analyzed. The 8 outer pixels are further divided into two sets of 4 pixels each as shown in FIG. 19. The partitioning of the outer ring into two sets is useful for reducing the likelihood of false alarms in detecting straight-line segments as halftones (since most commonly encountered halftones are typically classified as clustered dots or line-screens).

For each set, the pixel values are compared among the members of the set to determine the minimum and maximum values within each set independently:

$$A_{max}=\max(Aij); \text{ over all } (i, j) \text{ belonging to the set } A; \quad (23)$$

$$A_{min}=\min(Aij); \text{ over all } (i, j) \text{ belonging to the set } A; \quad (24)$$

$$B_{max}=\max(Bij); \text{ over all } (i, j) \text{ belonging to the set } B; \quad (25)$$

$$B_{min}=\min(Bij); \text{ over all } (i, j) \text{ belonging to the set } B; \quad (26)$$

Then the overall outer ring contrast is computed from the above values:

$$\Delta_{ring}=\max(A_{max}, B_{max})-\min(A_{min}, B_{min}); \quad (27)$$

The value of $\Delta_{ring}$ is next tested to see if there is any contrast for the outer ring. Regardless of the center pixel value, the output is set to zero (not an extremum point) if the value of $\Delta_{ring}$ is less than or equal to a pre-defined small threshold T2:

$$\text{If } (\Delta_{ring} \leq T2), \text{ return } (0); \quad (28)$$

If, on the other hand, there is sufficient activity in the outer ring (as indicated by outer ring contrast>T2), then two tests are made to see if the center pixel value is at an extreme value relative to the outer ring values. The center pixel value X is defined to be at a peak if it is (significantly) larger than the maximum pixel value of either set:

$$\text{If } [(A_{max}+S<X) \text{ AND } (B_{max} \leq X)], \text{ return } (1); \quad (29)$$

where S is the outer ring contrast, scaled by a contrast scaling parameter C:

$$S = \Delta_{ring}/C; \tag{30}$$

In one embodiment, the contrast scaling parameter C is set to equal to 8. The actual value of the scaling parameter C is a function of the signal noise level at the input. It is desirable to maintain the value of C as a generic parameter of the Min-Max Detection units. The value of C can be limited to a power-of-two number so that it could be implemented as an arithmetic shift to save the need to perform a division operation per pixel.

Similarly, the center pixel value X is defined to be at a valley if it is (significantly) smaller than the minimum pixel value from either set A or B:

$$\text{If } [(A_{min} > X+S) \text{ AND } (B_{min} \geq X)], \text{ return } (1); \tag{31}$$

Equations (29) and (31) determine the two conditions where the output from the 3×3 detection window are set to 1; in all other cases the output will be set to 0.

In a second embodiment, the center pixel value X is defined to be at a peak if it is (significantly) larger than the maximum pixel value of either set:

$$\text{If } [(A_{max} + N_{TH} < X) \text{ AND } (B_{max} \leq X)], \text{ return } (1); \tag{29A}$$

where $N_{TH}$ is the noise threshold defined as:

$$N_{TH} = \text{NoiseBias} + (\text{NoiseFactor} \times X)/256$$

where the NoiseBias and the NoiseFactor are tuning parameters.

Similarly, the center pixel value X is defined to be at a valley if it is (significantly) smaller than the minimum pixel value from either set A or B:

$$\text{If } [(A_{min} > X + N_{TH}) \text{ AND } (B_{min} > X)], \text{ return } (1); \tag{31A}$$

Equations (29A) and (31A) determine the two conditions where the output from the 3×3 detection window are set to 1; in all other cases the output will be set to 0. Note that in this second embodiment, there is no need to compute the overall outer ring contrast.

Finally, each color component is processed independently through its own separate 3×3 window. The three binary outputs of the color components are then added together to form the final 2-bit output of the Min-Max Detection module.

The two Min-Max Detection-outputs C2 and D2 are fed to the Cascaded Filter Chain C3–C6 and D3–D6, respectively. The first filtering units, C3 and D3 are different between the two chains, but other than that, the subsequent units C4–C6 and D4–D6 are all identical.

The first Filter unit C3 receives the 2-bit output from the high-resolution Min-Max detection unit C2. The input is filtered through the F_7/4 filter, which, in one embodiment, is a 7×7 symmetric, triangular, and separable filter. The /4 notation indicates that filter F_7/4 also sub-samples the filtered output by a factor of 4 in both direction. This means that the filter F_7/4 only produces one output pixel for every fourth input pixel and every fourth line, thereby effectively reducing the data bandwidth by a factor of 16.

Since the input to the first filtering unit C3 is limited to 2-bits (rather than 8 bits), the output of the filter is normalized by scaling the result by a different power-of-two number (e.g., 2). The scaling power should remain a design parameter. After the first normalization, however, the result has been scaled to fit the range of 8-bits, so that subsequent filtering is utilizing the 8-bit representation system from this point forward.

The second chain leading filter unit D3 is different than C3 in two aspects. First, the F_5/2 filter only sub-samples the input by a factor of 2 (rather than 4) in each direction. This means that the filter only produces one output pixel for every other input pixel and every other line, thereby effectively reducing the data bandwidth by a factor of 4. Since the sub-sampling factor is smaller, the span of the filter can consequently be reduced from 7 (for C3) to 5 (for D3). In one embodiment, the normalization factor for the F_5/2 filter was determined to be $2^9$. Note that the (8-bit wide now) outputs from the two leading filter units C3 and D3 are both at the same resolution—sub-sampled by 4 in both dimension, or $\frac{1}{16}$ th of the original input bandwidth. This is because the F_7/4 filter of the C3 unit in the upper chain is sub-sampling the data by 4, while the combination of the SS/2 and F_5/2 unit D3 in the lower chain results in an overall output rate that matches the output rate of C3.

The two outputs from the filtering units C3 and D3 are further filtered through the three additional and identical units C4–C6 and D4–D6 respectively. Each of the six filtering units processes its respective input signal with an F_3/2 filter (with coefficients 1-2-1) which also sub-samples the data by a factor of 2 in both directions. Note that each of these filters has a total weight of 1+2+1=4, thus the implementation can be simplified by replacing the normalization division with a simple arithmetic shift right by 2.

Since each of the filtering units is also sub-sampling its respective input signal by a factor of 2, the signals at the respective outputs of the C6 and D6 filter units are in effect sub-sampled by a factor of 32 in each direction (or 1024 times reduced in bandwidth).

The next two filter units C7 and D7 are special filter units, denoted as a Fz_5 filter. The z suffix indicates a filter that eliminates any zero terms from the total normalization weight. The general Fz_n filter equation is as following:

$$\text{output value} = \frac{\sum a_{ij} * w_{ij}}{\sum w_{ij} * \delta(a_{ij})}; \tag{32}$$

where $a_{ij}$ are the 2D input values, $w_{ij}$ are the 2D filter coefficients, and $\delta(a_{ij})$ is the function defined as:

$$\delta(a_{ij}) = 1 \text{ if } a_{ij} \neq 0; \text{ otherwise } \delta(a_{ij}) = 0; \tag{33}$$

As can be seen from equation (32), the difference from a regular filter is in that the total weight is no longer just a known normalization constant. Since the number of incoming pixels having the value of zero is not known in advance, an ongoing accumulator for the weight must be kept. At the same time the filter loop is operating, the content of the accumulator is increased by the value of the current filter coefficient if the corresponding input value is non zero.

Since the total weight is not fixed and known in advance, the final normalization of the filter output is dependent on the value of the total weight. However, it is still possible to avoid the division operation in equation (32) by using a predetermined multiplication table with multiple choices for the possible total weight values.

The purpose of using the special Fz_5 filters is to obtain reliable frequency and halftone weight estimates even when the filter gets very close to an edge.

The two MX_5 modules C8 and D8 search for the maximum value in a 5×5 window and output the maximum value.

Each of the two Interpolation modules C9 and D10 interpolates (i.e., up-samples) the signal back by a factor of 32 to restore it to the original resolution. Each interpolation unit is performing bilinear interpolation, essentially generating 32*32 pixels for each 4 original pixels. The step size for the bilinear interpolation is ⅓₂ nd of the original pixel grid.

The Halftone Weight module HTW receives as input the outputs of the two interpolation units denoted as FRQ and FRQ_B. The Halftone Weight module adds together the contribution from each of the input as following:

$$HTW = HTW_H + H_{TWL}; \qquad (34)$$

where $$HTW^H = (FRQ - T_H) * SF_H \text{ if } FRQ > T_H; \text{ 0 otherwise}; \qquad (35)$$

$$HTW_L = (FRQ\_B - T_L) * SF_L \text{ if } FRQ\_B > T_L; \text{ 0 otherwise}; \qquad (36)$$

where $T_H$ and $T_L$ are two predetermined thresholds, and $SF_H$ and $SF_L$ are two predetermined scale factors for the original (high) and filtered (low) frequencies FRQ and FRQ_B respectively.

An additional logic ensures that the value of HTW is limited to never exceed the allowed 8-bit range of [0, 255].

Figure 20:
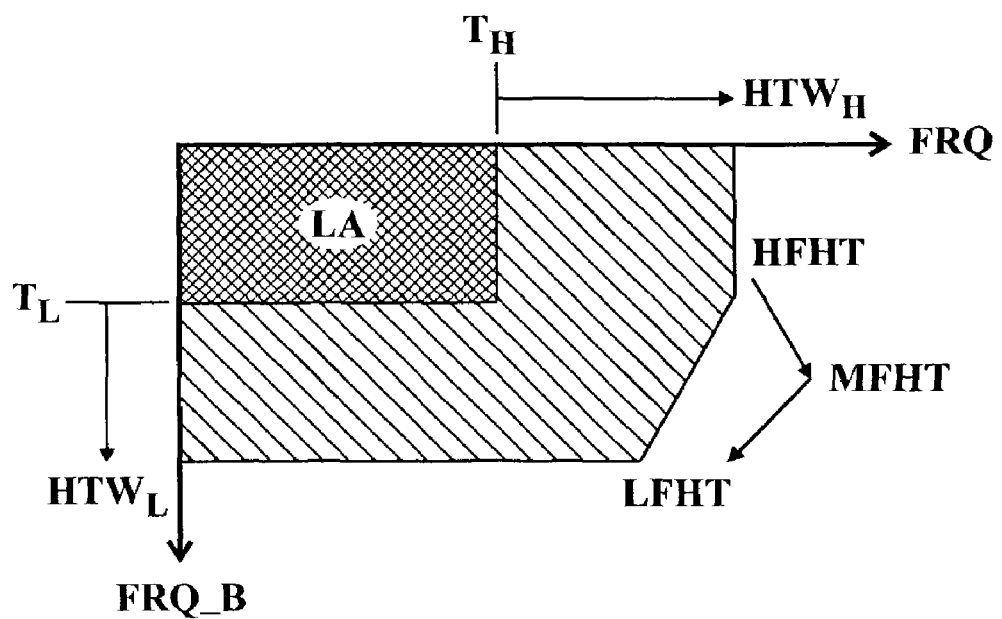
FIG. 20 illustrates the equations that implement the halftone weight module included in the halftone estimate module.

FIG. 20 is a diagram illustrating the equations (34), (35), (36) and the clipping effect of the additional logic which limits the value of HTW to the allowed range. The region denoted as "LA" represents the line-art region. As illustrated in FIG. 20, one particular color screen pattern can change from the location indicated as HFHT to MFHT to LFHT as its frequency is changed from high to medium to low. Since the curve illustrated by the loci on the 2D plot is convex, it is not possible to distinguish the screen frequency by observing either FRQ or FRQ_B alone.

In the description above, elements of an embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, read-only memory (ROM), erasable ROM). Examples of firmware may include microcode, writable control store, microprogrammed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read-only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the above description of the invention. The term "code" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus or system may include any combination of hardware, software, and firmware modules.

One embodiment of the invention may be described as a method or process which is usually depicted as a flowchart, a flow diagram, a structure diagram, or a block diagram. Although any of these depictions may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

While certain exemplary embodiments have been described in detail and shown in the accompanying drawings, those of ordinary skill in the art will recognize that the invention is not limited to the embodiments described and that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A method for separating an image signal into a set of image planes, the method comprising the operations of:
    (a) searching, via a min-max module, for a minimum and a maximum within at least one window centered on a current pixel in the image signal;
    (b) computing, via a dynamic threshold module, for the at least one window, based on the respective minimum and maximum received from the min-max module and the current pixel, a respective indicator representing the distance and direction of the current pixel relative to a respective threshold plane, and outputting a control signal based on the indicator; and
    (c) separating the image signal into the set of image planes in accordance with the control signal by including a representation of the current pixel in at least one of the image planes, via a separation module.

2. The method of claim 1 wherein the image signal comprises a luminance signal, a first chroma signal and a second chroma signal, and wherein operation (a) comprises the operations of:
    searching for a luminance minimum and a luminance maximum in the luminance signal within the window;
    indexing locations of the luminance maximum and luminance minimum within the window; and
    outputting the luminance minimum, the luminance maximum, and values in the first and the second chroma signals that correspond to the locations of the luminance minimum and luminance maximum.

3. The method of claim 2 wherein the operations of searching, indexing and outputting are performed for each window in a set of windows.

4. The method of claim 1 wherein operation (a) comprises the operations of:
    searching for a first minimum and a first maximum within a first window centered on the current pixel in the image signal, using a first min-max block, the first window corresponding to a first context; and
    searching for a second minimum and a second maximum within a second window centered on the current pixel in the image signal, using a second min-max block, the second window corresponding to a second context;
wherein the second context is substantially larger than the first context.

5. The method of claim 1 wherein operation (a) is performed for a set of windows and wherein operation (b) comprises the operations of:
    computing, for each of the windows, a respective contrast vector;
    computing, for each of the windows, a bias vector and a dot product of the respective contrast vector and a respective thresholded pixel vector representing the current pixel thresholded by the bias vector, the dot product representing the respective indicator; and
    outputting a control signal based on the respective indicators.

6. The method of claim 5 wherein, for one of the windows, the bias vector represents the average between the respective maximum and minimum.

7. The method of claim 5 wherein, for one of the windows, the bias vector represents the average between a vector representing a lowpass filtered neighborhood of the current pixel and the average between the respective maximum and minimum.

8. The method of claim 1 wherein operation (b) comprises the operations of:
    (1) computing a first indicator for a first window using a first logic block, the first indicator representing the distance and direction of the current pixel relative to a first threshold plane;
    (2) computing a second indicator for a second window using a second logic block, the second indicator representing the distance and direction of the current pixel relative to a second threshold plane;
    (3) thresholding the current pixel in the image signal using a third logic block and outputting a third logic block signal; and
    (4) generating the control signals using a decision module in communication with the first, second, and third logic blocks, the control signals being based on the first and second indicators and the third logic block signal.

9. The method of claim 8 wherein operation (1) further comprises the operation of computing a first activity measure indicating activity in the first window, and wherein operation (2) further comprises the operation of computing a second activity measure indicating activity in the second window.

10. The method of claim 9 wherein operation (4) comprises the operations of:
    comparing the first activity measure with the second activity measure and outputting a select signal, using a comparator block; and
    receiving the first indicator, the second indicator and the third logic block signal, selecting and outputting one of the first indicator, the second indicator and third logic block signal in accordance with the select signal, using a multiplexer.

11. The method of claim 1 wherein operation (c) comprises the operations of:
    receiving the control signal and producing a selector signal, using a selector module;
    receiving the selector signal and producing a decision signal, using an edge processing module; and
    receiving the image signal and the decision signal, and outputting a foreground signal and a background signal, using a foreground/background separation module, a representation of the current pixel of the image signal being included in at least one of the foreground signal and the background signal in accordance with the decision signal.

12. The method of claim 11 wherein operation (c) further comprises the operations of:
    receiving the foreground signal and the background signal;
    filling undefined pixels in the foreground and background signals with values computed so as to substantially prevent artifacts and to facilitate good compression ratio; and
    outputting a final foreground signal and a final background signal.

13. The method of claim 12 wherein the operation of filling comprises:
    extending content of defined pixels in each of the foreground and background signals to neighboring undefined pixels by filling neighboring undefined pixels with diluted foreground and background values, respectively, using a dilate module;
    averaging non-zero content of the diluted foreground and background values over minimum coded unit blocks and outputting averaged block values, using a block average module; and
    filling any remaining undefined pixels with the averaged block values, using a fill module.

14. A system for separating an image signal into a set of image planes, the system comprising:
（a) a min-max module receiving the image signal, searching for a minimum and a maximum within at least one window centered on a current pixel in the image signal;
（b) a dynamic threshold module, in communication with the min-max module, computing, for the at least window, based on the respective minimum and maximum received from the min-max module and the current pixel, a respective indicator representing the distance and direction of the current pixel relative to a respective threshold plane, and outputting a control signal based on the indicator; and
（c) a separation module, in communication with the dynamic threshold module, separating the image signal into the set of image planes in accordance with the control signal by including a representation of the current pixel in at least one of the image planes.

15. The system of claim 14 wherein the image signal comprises a luminance signal, a first chroma signal and a second chroma signal, and wherein the min-max module:
searches for a luminance minimum and a luminance maximum in the luminance signal within the window;
indexes locations of the luminance maximum and luminance minimum within the window; and
outputs the luminance minimum, the luminance maximum, and values in the first and the second chroma signals that correspond to the locations of the luminance minimum and the luminance maximum.

16. The system of claim 15 wherein the min-max module searches for a minimum and maximum within each of a set of windows centered on the current pixel in the image signal.

17. The system of claim 14 wherein the min-max module comprises:
a first min-max block searching for a first minimum and a first maximum within a first window centered on the current pixel in the image signal, the first window corresponding to a first context; and
a second min-max block searching for a second minimum and a second maximum within a second window centered on the current pixel in the image signal, the second window corresponding to a second context;
wherein the second context is substantially larger than the first context.

18. The system of claim 14 wherein the min-max module searches for a minimum and maximum within each of a set of windows centered on the current pixel in the image signal, and wherein the dynamic threshold module comprises:
a first module computing, for each of the windows, a respective contrast vector; and
a second module computing, for each of the windows, a bias vector and a dot product of the respective contrast vector and a respective thresholded pixel vector representing the current pixel thresholded by the bias vector, the dot product representing the respective indicator.

19. The system of claim 18 wherein, for one of the windows, the second module computes the bias vector by computing the average between the respective maximum and minimum.

20. The system of claim 18 wherein, for one of the windows, the second module computes the bias vector by computing the average between a vector representing a lowpass filtered neighborhood of the current pixel and the average between the respective maximum and minimum.

21. The system of claim 14 wherein the threshold module comprises:
(1) a first logic block computing a first indicator for the first window, the first indicator representing the distance and direction of the current pixel relative to a first threshold plane;
(2) a second logic block computing a second indicator for the second window, the second indicator representing the distance and direction of the current pixel relative to a second threshold plane;
(3) a third logic block thresholding the current pixel in the image signal and outputting a third logic block signal; and
(4) a decision module generating the control signals in communication with the first, second, and third logic blocks, the control signals being based on the first and second indicators and the third logic block signal.

22. The system of claim 21 wherein the first logic block computes a first activity measure indicating activity in the first window, and wherein the second logic block computes a second activity measure indicating activity in the second window.

23. The system of claim 22 wherein the decision module comprises:
a comparator block comparing the first activity measure with the second activity measure and outputting a select signal; and
a multiplexer receiving the first indicator, the second indicator and the third logic block signal, selecting and outputting one of the first indicator, the second indicator and third logic block signal in accordance with the select signal.

24. The system of claim 14 wherein the separation module comprises:
a selector module receiving the control signal and producing a selector signal;
an edge processing module receiving the selector signal and producing a decision signal;
a foreground/background separation module receiving the image signal and the decision signal, and outputting a foreground signal and a background signal, a representation of the current pixel of the image signal being included in at least one of the foreground signal and the background signal in accordance with the decision signal.

25. The system of claim 24 wherein the separation module further comprises:
a cleanup module receiving the foreground signal and the background signal, filling undefined pixels in the foreground and background signals with values computed so as to substantially prevent compression ringing artifacts and to facilitate good compression ratio, and outputting a final foreground signal and a final background signal.

26. The system of claim 25 wherein the cleanup module comprises:
a dilate module extending content of defined pixels in each of the foreground and background signals to neighboring undefined pixels by filling neighboring undefined pixels with diluted foreground and background values, respectively;
a block average module averaging non-zero content of the diluted foreground and background values over minimum coded unit blocks and outputting averaged block values; and
a fill module filling any remaining undefined pixels with the averaged block values.

* * * * *